United States Patent
Watanabe

(10) Patent No.: US 11,624,995 B2
(45) Date of Patent: Apr. 11, 2023

(54) IMAGE FORMING APPARATUS THAT CONTROLS FAILURE DIAGNOSIS START TIMIMG BASED ON TYPE OF ERROR DETECTED AND CONTROL METHOD THEREFOR

(71) Applicant: CANON KABUSHIKI KAISHA, Tokyo (JP)

(72) Inventor: Naoto Watanabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/099,723

(22) Filed: Nov. 16, 2020

(65) Prior Publication Data

US 2021/0149330 A1 May 20, 2021

(30) Foreign Application Priority Data

Nov. 19, 2019 (JP) .............................. JP2019-208914

(51) Int. Cl.
    *G03G 15/00* (2006.01)
    *H04N 1/00* (2006.01)
(52) U.S. Cl.
    CPC ......... *G03G 15/55* (2013.01); *H04N 1/00029* (2013.01); *H04N 1/00037* (2013.01); *H04N 1/00082* (2013.01)
(58) Field of Classification Search
    USPC .......................................................... 399/31
    See application file for complete search history.

(56) References Cited

U.S. PATENT DOCUMENTS

| 9,541,876 | B1* | 1/2017 | Cousoulis | G03G 15/161 |
| 2003/0091357 | A1* | 5/2003 | Maebashi | G03G 15/5058 |
| | | | | 399/49 |
| 2004/0101320 | A1* | 5/2004 | Haramoto | G03G 15/55 |
| | | | | 399/12 |
| 2009/0290884 | A1* | 11/2009 | Omoya | G03G 15/5058 |
| | | | | 399/27 |
| 2019/0129342 | A1* | 5/2019 | Ikeda | G03G 15/553 |
| 2019/0227474 | A1* | 7/2019 | Isamikawa | G03G 15/55 |
| 2020/0233346 | A1* | 7/2020 | Sato | G03G 15/2039 |

FOREIGN PATENT DOCUMENTS

JP     2005237046 A     9/2005

* cited by examiner

*Primary Examiner* — Quana Grainger
(74) *Attorney, Agent, or Firm* — Rossi, Kimms & McDowell LLP

(57) ABSTRACT

An image forming apparatus that is capable of specifying a failed portion while preventing delay of an image forming operation appropriately. An image forming unit forms an image on a recording material. A detection unit detects an abnormality. A controller determines a type of an abnormality detected by the detection unit. The controller controls, in a case where the abnormality is detected by the detection unit, a start timing of failure diagnosis that specifies a failed portion that causes the abnormality according to the determined type of the abnormality.

14 Claims, 20 Drawing Sheets

CLOSED STATE OF SENSOR SHUTTER

OPENED STATE OF SENSOR SHUTTER

*FIG. 11*

| Error Code | Type | Content of Detected Abnormality |
|---|---|---|
| E001 | 1 | Abnormality of Toner Density of Development Device (Yellow) |
| E002 | 1 | Abnormality of Toner Density of Development Device (Magenta) |
| E003 | 1 | Abnormality of Toner Density of Development Device (Cyan) |
| E004 | 1 | Abnormality of Toner Density of Development Device (Black) |
| E005 | 1 | Malrotation of Fun |
| E006 | 1 | Abnormality of Belt-Contact-State Change Unit |
| E007 | 1 | Malrotation of Monochrome Drum Motor |
| E008 | 1 | Malrotation of Color Drum Motor |
| E009 | 1 | Malrotation of Fixing Motor |
| E010 | 1 | Abnormality of Fixing Temperature |
| E011 | 2 | Abnormality of Lift-Up Operation of First Sheet Cassette |
| E012 | 2 | Abnormality of Lift-Up Operation of Second Sheet Cassette |
| E013 | 2 | Abnormality of Lift-Up Operation of Third Sheet Cassette |
| E014 | 2 | Abnormality of Lift-Up Operation of Fourth Sheet Cassette |
| E015 | 2 | Abnormality of Density Sensor Unit |

Failed Portion is Determined

Failed Portion is Undetermined

FIG. 16

| Diagnosis Target | Power Source Section | Signal Output Section | Control Circuit Section | Load Operation Section |
|---|---|---|---|---|
| Contact-State Change Motor | +24V_B_FU | Contact-State-Change-Motor Control Signal | Contact-State-Change-Motor Driver | Belt-Ccontact-State Change Unit |
| Monochrome Drum Motor | +24V_B_FU | Monochrome-Drum-Motor Control Signal | Monochrome-Drum-Motor Driver | Monochrome Photosensitive Drum |
| Color Drum Motor | +24V_B_FU | Color-Drum-Motor Control Signal | Color-Drum-Motor Driver | Color Photosensitive Drums |
| Fixing Motor | +24V_B_FU | Fixing-Motor Control Signal | Fixing-Motor Driver | Fixing Unit |
| First Lifter Motor | +24V_B_FU | First-Lifter-Motor Control Signal | First-Lifter-Motor Driver | First Sheet Cassette |
| Second Lifter Motor | +24V_B_FU | Second-Lifter-Motor Control Signal | Second-Lifter-Motor Driver | Second Sheet Cassette |
| Third Lifter Motor | +24V_B_FU | Third-Lifter-Motor Control Signal | Third-Lifter-Motor Driver | Third Sheet Cassette |
| Fourth Lifter Motor | +24V_B_FU | Fourth-Lifter-Motor Control Signal | Fourth-Lifter-Motor Driver | Fourth Sheet Cassette |
| Shutter Solenoid | +24V_B_FU | Solenoid Control Signal | Solenoid Driver | Density Sensor Unit |

IMAGE FORMING APPARATUS THAT CONTROLS FAILURE DIAGNOSIS START TIMIMG BASED ON TYPE OF ERROR DETECTED AND CONTROL METHOD THEREFOR

BACKGROUND OF THE INVENTION

Field of the Invention

The present invention relates to an image forming apparatus that specifies cause of an occurred abnormality and a control method therefor.

Description of the Related Art

When detecting an abnormality of an operation, an image forming apparatus, such as a copying machine or a printer, reports occurrence of the abnormality by displaying an error code or by transmitting the error code to a call center through a network. For example, an error code corresponding to the detected abnormality is displayed. A plurality of parts, such as a power source unit, a substrate, and a mechanical structure, may be failed portions that cause the abnormality. Accordingly, when repairing an image forming apparatus on the basis of an error code, a service person specifies a failed portion by successively checking presence of failure of components relevant to the error code on a site. This may take a lot of time. Japanese Laid-Open Patent Publication (Kokai) No. 2005-237046 (JP 2005-237046A) discloses a method for specifying whether a failed portion is a high voltage power supply or a load like an electrification wire etc.

However, failures that occur in an image forming apparatus are various, and there are also many occurring error codes. When operations of a related motor etc. are needed for executing failure diagnosis to specify a failed portion according to an error code, it is necessary to start failure diagnosis after stopping operations of an image forming apparatus. However, since there are a plurality of types of abnormalities, if the failure diagnosis uniformly starts at the same timing irrespective of the types of abnormalities, there are the following problems.

The types of abnormalities include a first type that disables an image output operation and a second type that maintains the image output operation. For example, when a fixing device breaks down, the image output operation cannot be executed. Accordingly, the abnormality of the fixing device belongs to the first type. Even when an abnormality of the second type occurs, the image output operation is executable by using an alternative or by disabling a function temporarily. For example, even if one of a plurality of sheet feeding units breaks down, the image output operation is executable by using another sheet feeding unit that is not out of order as an alternative. When a density sensor unit that detects image density broke down, the image output operation is executable by employing an old correction value continuously without using a detection value of the density sensor unit at the time of correcting the image density. Accordingly, the abnormalities of the sheet feeding unit and density sensor unit belong to the second type.

When an abnormality of the first type occurs, since the image output operation cannot be executed, it is preferable to stop an operation of an image forming apparatus promptly and to execute failure diagnosis in order to report a failed portion promptly. In the meantime, when an abnormality of the second type occurs, since the image output operation is executable, for reducing downtime, it may be preferable to give priority to the image output operation than the failure diagnosis. Accordingly, if the image forming apparatus is stopped promptly and if the failure diagnosis is started in a case where the abnormality of the second type occurs, there is a problem that the end of the image output operation is delayed because the image output operation and a preparation operation that are under execution at the time are interrupted.

SUMMARY OF THE INVENTION

The present invention provides an image forming apparatus and a control method therefor that are capable of specifying a failed portion while preventing delay of an image forming operation appropriately.

Accordingly, a first aspect of the present invention provides an image forming apparatus including an image forming unit configured to form an image on a recording material, a detection unit configured to detect an abnormality, a controller configured to determine a type of an abnormality detected by the detection unit and to control, in a case where the abnormality is detected by the detection unit, a start timing of failure diagnosis that specifies a failed portion that causes the abnormality according to the determined type of the abnormality.

Accordingly, a second aspect of the present invention provides a control method for an image forming apparatus having an image forming unit that forms an image on a recording material and a detection unit that detects an abnormality, the control method including determining a type of an abnormality detected by the detection unit, and controlling, in a case where the abnormality is detected by the detection unit, a start timing of failure diagnosis that specifies a failed portion that causes the abnormality according to the determined type of the abnormality.

According to the present invention, a failed portion can be specified while preventing delay of an image forming operation appropriately.

Further features of the present invention will become apparent from the following description of exemplary embodiments with reference to the attached drawings.

BRIEF DESCRIPTION OF THE DRAWINGS

FIG. 11 is a view showing an example of a type data table of the image forming apparatus of FIG. 1.

FIG. 16 is a view showing an example of an electric failure diagnosis table stored in the image forming apparatus of FIG. 1.

DESCRIPTION OF THE EMBODIMENTS

Figure 1:
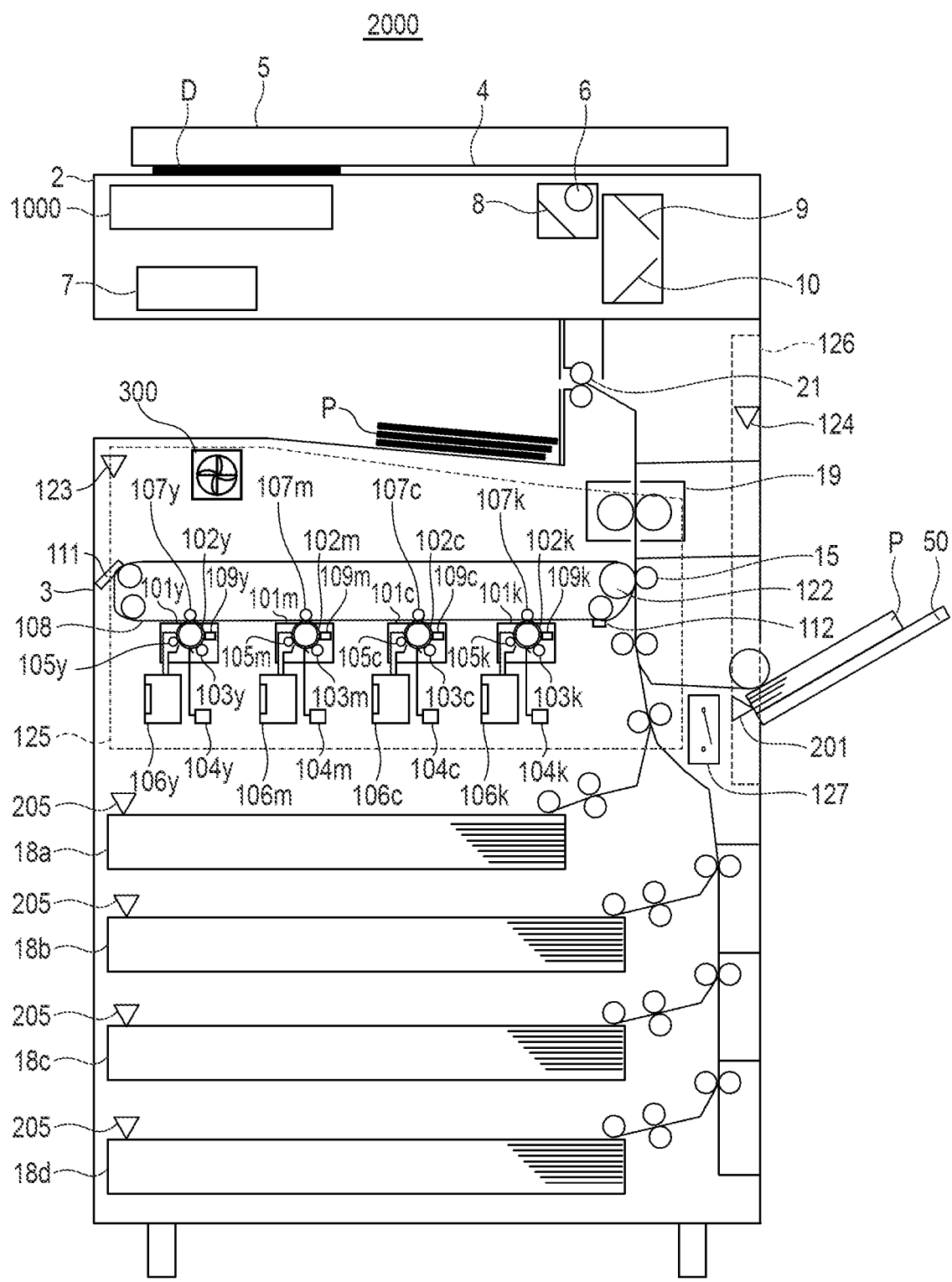
FIG. 1 is a schematic sectional view showing an image forming apparatus concerning an embodiment of the present invention.

Hereafter, embodiments according to the present invention will be described in detail by referring to the drawings.

FIG. 1 is a schematic sectional view showing an image forming apparatus according to a first embodiment of the present invention. This image forming apparatus 2000 is a color image forming apparatus using an electrophotographic system, for example. Particularly, the image forming apparatus 2000 employs an intermediate transfer tandem system in which process units 101y, 101m, 101c, and 101k are arranged side by side. The process units 101y, 101m, 101c, and 101k respectively form toner images of developers of four colors including yellow (Y), magenta (M), cyan (C), and black (Bk). The number of colors is not limited to four and the arrangement order is not limited to the above order.

The image forming apparatus 2000 consists of an image reader 2 and an image forming unit 3. A document platen 4 consisting of a clear glass plate is provided in an upper portion of the image reader 2. A document D that is placed on the document platen 4 so as to direct an image side downward is pressed and fixed with a document pressing plate 5. An optical system including a lamp 6 that illuminates the document D and reflective mirrors 8, 9, and 10 that guide an optical image of the illuminated document D to an image processing unit 7 is provided under the document platen 4. The lamp 6 and the reflective mirrors 8, 9, and 10 move at a predetermined speed and scan the document D.

In the image forming unit 3, the process units 101y, 101m, 101c, and 101k are arranged on an approximately horizontal straight line at a certain interval along an intermediate transfer belt 108 as an image bearing member. The process units 101y, 101m, 101c, and 101k are respectively provided with photosensitive drums (photosensitive members) 102y, 102m, 102c, and 102k, charge rollers 103y, 103m, 103c, and 103k, exposure devices 104y, 104m, 104c, and 104k, development devices 105y, 105m, 105c, and 105k, and auxiliary electrification brushes 109y, 109m, 109c, and 109k. Moreover, toner containers 106y, 106m, 106c, and 106k are respectively connected to the development devices 105y, 105m, 105c, and 105k. Furthermore, the image forming unit 3 is provided with primary transfer rollers 107y, 107m, 107c, and 107k corresponding to the photosensitive drums 102y, 102m, 102c, and 102k. Moreover, the image forming unit 3 is provided with the intermediate transfer belt 108, a density sensor 112, a secondary transfer roller 15, a transfer cleaning device 111, and a fixing device 19.

The intermediate transfer belt 108 is rotationally driven with a drive roller 122. The photosensitive drums 102y, 102m, 102c, and 102k are rotationally driven. The charge rollers 103y, 103m, 103c, and 103k electrifies uniformly the surfaces of the corresponding photosensitive drums 102y, 102m, 102c, and 102k. The exposure devices 104y, 104m, 104c, and 104k forms electrostatic latent images on the corresponding photosensitive drums 102y, 102m, 102c, and 102k on the basis of signals of image information that is given. The development devices 105y, 105m, 105c, and 105k develop the electrostatic latent images formed on the corresponding photosensitive drums 102y, 102m, 102c, and 102k and make them apparent as toner images. The toner images on the photosensitive drum 102y, 102m, 102c, and 102k are transferred onto the intermediate transfer belt (image bearing member) 108 because predetermined pressure and electrostatic load bias are given by the corresponding primary transfer rollers 107y, 107m, 107c, and 107k.

The toner images of the respective colors are piled up on the intermediate transfer belt 108, are conveyed, and are transferred onto a sheet P as a recording material at a nip portion at which the drive roller 122 contacts a secondary transfer roller 15 through the intermediate transfer belt 108. The transfer residual toners on the intermediate transfer belt 108 after passing the above-mentioned nip portion are collected by the transfer cleaning device 111. The sheet P is supplied from one of a first sheet cassette 18a, a second sheet cassette 18b, a third sheet cassettes 18c and a fourth sheet cassettes 18d as four container units or from a manual feed tray 50. Sheets are stored so as to be stacked in the sheet cassettes 18a through 18d. The sheet P is fed in accordance with an image formation timing by a separator mechanism (mentioned later by referring to FIG. 7 through FIG. 9). The sent-out sheet P passes a conveyance path and is sent to the above-mentioned nip portion after a skew correction and a timing correction are performed at a registration roller pair.

The fixing device 19 is provided in a downstream side of the above-mentioned nip portion. The fixing device 19 fixes the toner image on the sheet P conveyed. The sheet P on which the toner image is fixed by the fixing device 19 is ejected by an ejection roller pair 21 outside the image forming apparatus 2000. The image forming apparatus 2000 is provided with an operation unit 1000. The operation unit 1000 has a display unit. Moreover, the image forming unit 3 is provided with a cooling fan 300. A front cover 125 is installed in a front face of the image forming apparatus 2000. A user is able to access exchangeable consumables, such as the photosensitive drums 102y, 102m, 102c, and 102k and the development devices 105y, 105m, 105c, and 105k by opening the front cover 125. An opened/closed state of the front cover 125 is detected by a front cover sensor 123.

A right cover 126 is installed in a right face of the image forming apparatus 2000. When opening the right cover 126, the user is able to access exchangeable consumables, such as the intermediate transfer belt 108 and is able to remove a residual sheet due to occurrence of paper jam. An opened/closed state of the right cover 126 is detected by a right cover sensor 124. An interlock switch 127 is provided between the front cover 125 and the right cover 126 so that power supply to a load operation section is intercepted when either cover is opened.

A cassette open/close sensor 205 that detects opening and closing, and a size sensor (not shown) that detects a size of the stored sheets P are provided in each of the sheet cassettes 18a, 18b, 18c, and 18d. When the sheet cassette is closed, a sheet size is detected automatically on the basis of the output of the size sensor. Moreover, a manual feed sensor 201 that detects the presence of the sheet P on the manual feed tray 50 is provided in the manual feed tray 50. When the manual feed sensor 201 detects the sheet P being placed, a screen that prompts a user to set a size of the placed sheet P is displayed on the operation unit 1000. When the user sets up the sheet size according to an instruction on the screen, the image forming apparatus 2000 recognizes the size of the sheet P placed on the tray.

Figure 2:
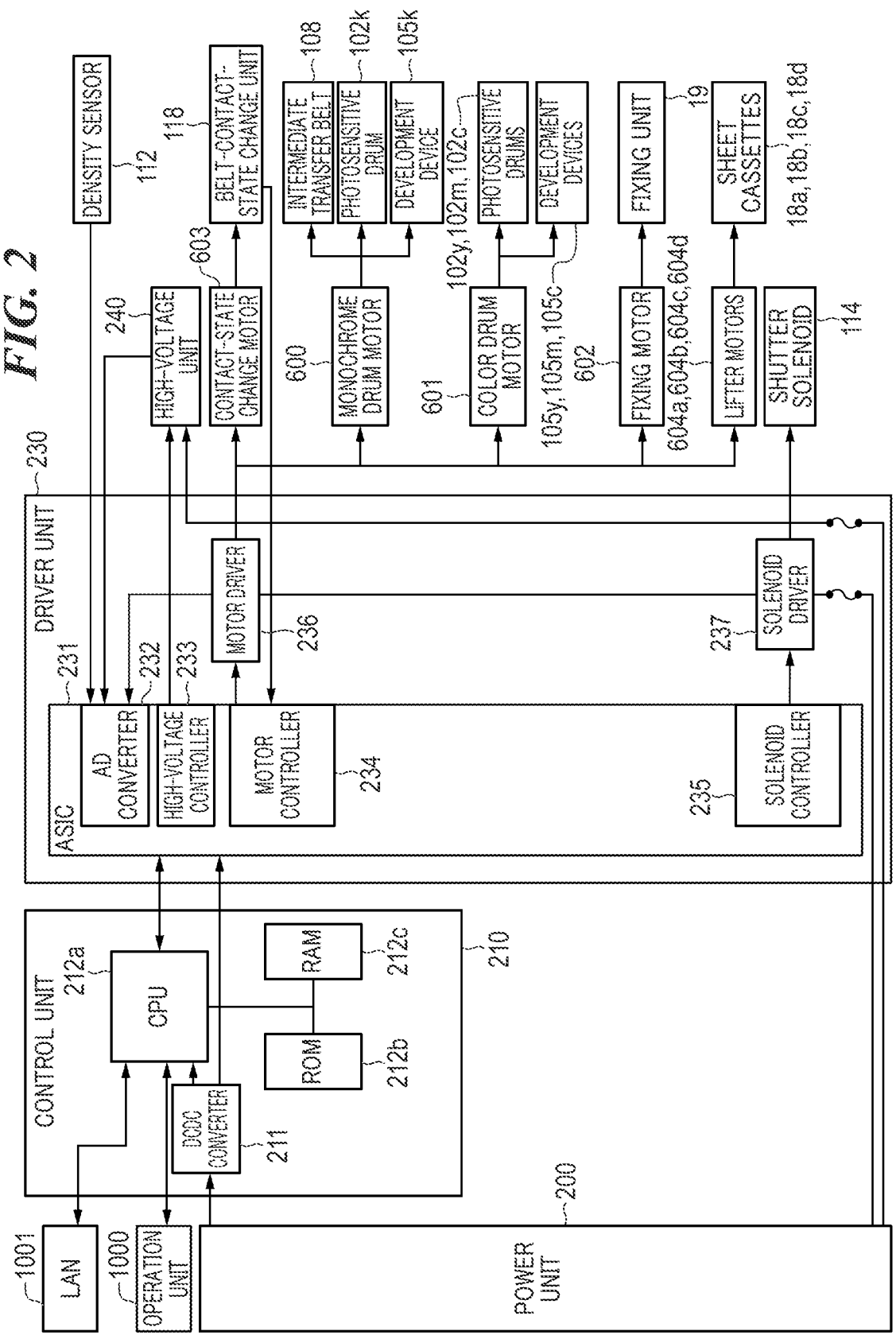
FIG. 2 is a block diagram showing a control system of the image forming apparatus of FIG. 1.
Figure 3:
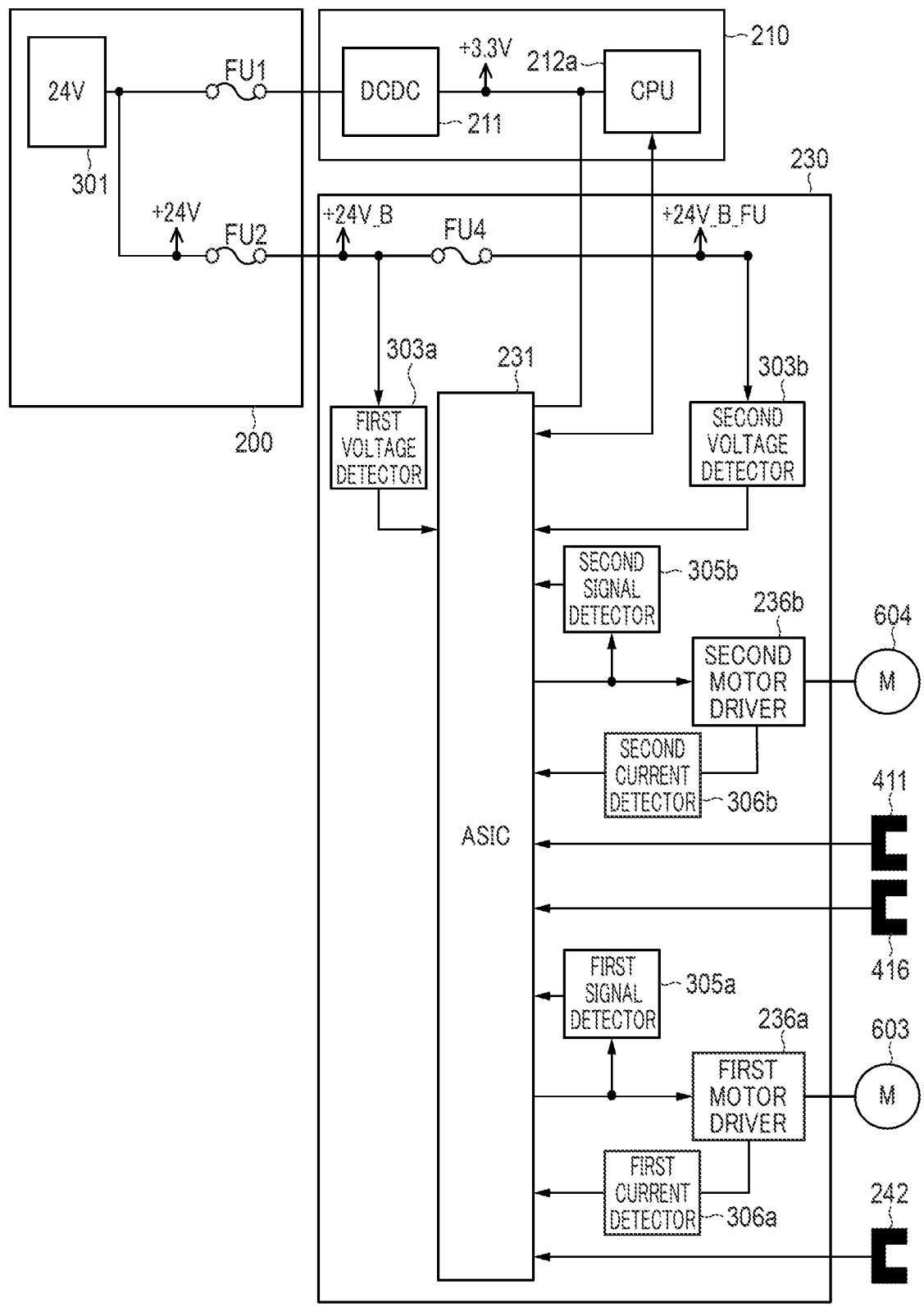
FIG. 3 is a control circuit diagram of the image forming apparatus of FIG. 1.

FIG. 2 is a block diagram schematically showing a control system of the image forming apparatus 2000. FIG. 3 is a control circuit diagram of the image forming apparatus 2000. The control system is provided with a power unit 200, a control unit 210, a driver unit 230, and a high-voltage unit 240. These units constitute a power source section, a signal output section, a control section, a control circuit section, and the load operation section that are described hereinafter.

The power source section will be described. The control section is mainly configured by the power unit 200. The power unit 200 outputs supply voltage of +24V. The power unit 200 distributes power supply voltage through the fuses FU1 and FU2, and supplies electric power to each component. The controller 210 decreases the power supply voltage of +24V supplied from the power unit 200 to voltage of 3.3V with a DCDC converter 211 and supplies to a CPU 212a, an ASIC 231 of the driver unit 230, etc. The driver unit 230 further subdivides the supply voltage of +24V supplied from the power unit 200 with the ASIC 231 and supplies electric power to the high-voltage unit 240 and a motor driver 236 (a first motor driver 236a and a second motor driver 236b).

The control section will be described. The control section is mainly configured by the control unit 210. The control unit 210 performs various control sequences about image formation etc. because the CPU 212a runs a control program stored in a ROM 212b and controls operations of components. At the time, a RAM 212c is used as a work memory and stores rewritable data. The RAM 212c stores a high-voltage setting value to the high-voltage unit 240 and drive-setting information about an exchangeable unit, for example. The CPU 212a is connected to the ASIC 231 of the driver unit 230 through serial communication. The CPU 212a controls an operation of the ASIC 231 by performing read/write operations by serial communication with a register inside the ASIC 231 and the RAM 212c. Moreover, the CPU 212a generates information required for print image output, such as a sheet cassette to be used and a color mode (monochrome or color) to be set up, according to control of the execution timing of the image output request from a user or a request content of image output.

The signal output section will be described. The signal output section is mainly configured by the ASIC 231. The ASIC 231 is provided with functional modules, such as an AD converter 232, a high-voltage controller 233, a motor controller 234, and a solenoid controller 235. The driver unit 230 controls a monochrome drum motor 600, a color drum motor 601, a fixing motor 602, a contact-state changing motor 603, and lifter motors 604 (a first lifter motor 604a, a second lifter motor 604b, a third lifter motor 604c, and a fourth lifter motor 604d). The AD converter 232 takes in an analog signal value. The high-voltage controller 233 controls the high voltage unit 240. The motor controller 234 controls the motor driver 236. The solenoid controller 235 controls the solenoid driver 237. The ASIC 231 obtains setting values from the CPU 212a through serial communication and sets up the functional modules on the basis of the respective setting values. Each functional module outputs a control signal because a logic circuit operates according to each setting value.

The contact-state change motor 603 drives the belt-contact-state change unit 118 (mentioned later by referring to FIG. 4A through FIG. 4C). The monochrome drum motor 600 drives the photosensitive drum 102k, intermediate transfer belt 108, and development device 105k. The color drum motor 601 drives the photosensitive drums 102y, 102m, and 102c and the development devices 105y, 105m, and 105c. The fixing motor 602 drives the fixing device 19. The lifter motors 604 (604a through 604d) are provided corresponding to the respective sheet cassettes 18a through 18d. The lifter motors 604a through 604d drive the corresponding sheet cassettes 18a through 18d (mentioned later by referring to FIG. 7 and FIG. 8). The output of the density sensor 112 is supplied to the ASIC 231.

The control circuit section will be described. The control circuit section is mainly configured by the motor driver 236 and solenoid driver 237 provided in the driver unit 230. As shown in FIG. 3, the driver unit 230 is further provided with a first signal detector 305a, second signal detector 305b, first current detector 306a, and second current detector 306b. Furthermore, the driver unit 230 is provided with a first voltage detector 303a and second voltage detector 303b. Although a motor driver, signal detector, and current detector are provided for every motor, FIG. 3 shows them only for the contact-state change motor 603 and one of the lifter motors 604. The first motor driver 236a drives the contact-state change motor 603. The second motor driver 236b drives one of the lifter motors 604. The solenoid driver 237 drives a shutter solenoid 114. The control circuit section operates according to the power supply from the power source section and the output signal from the signal output section. For example, the motor driver 236 is provided with a driver IC as a circuit for driving a motor. The driver IC rotationally controls the motor when a control signal for rotating the motor is input.

The load operation section includes the photosensitive drums 102y, 102m, 102c, and 102k, intermediate transfer belt 108, development devices 105y, 105m, 105c, and 105k, fixing device 19, belt-contact-state change unit 118, and sheet cassettes 18a through 18d. When the motor is rotated by the motor driver 236, the load operation section corresponding to the motor is driven.

The CPU 212a is connected to the operation unit 1000 and a LAN 1001 as shown in FIG. 2. The CPU 212a obtains an input signal, such as an instruction, from the operation unit 1000 and displays information corresponding to the input signal on the operation unit 1000. The CPU 212a communicates with external apparatuses, such as a computer, through the LAN 1001. Output signals of a top face sensor 411 (mentioned later by referring to FIG. 7 and FIG. 8), a rise sensor 416 (mentioned later by referring to FIG. 10), and a home position sensor (HP sensor) 242 (mentioned later by referring to FIG. 4A through FIG. 4C) are input into the ASIC 231.

Abnormalities in various places of the image forming apparatus 2000 are detected by the sensors. There are a plurality of types of abnormalities. A first type and second type among the types will be described. The first type is an abnormality type that disables an image forming operation unless a failed portion is restored. The second type is an abnormality type that enables an image forming operation even if a failed portion is not restored.

An example of the first type will be described. FIG. 4A through FIG. 4C are schematic views showing the belt-contact-state change unit 118. The belt-contact-state change unit 118 switches between contact states and separated states of the intermediate transfer belt 108 and the primary transfer rollers 107y, 107m, 107c, and 107k to the photosensitive drums 102y, 102m, 102c, and 102k by rotation of the contact-state change motor 603 that is a stepping motor. A home position flag (HP flag) 243 operates interlocking with rotation of the contact-state change motor 603. The HP sensor 242 detects three contact states of the intermediate transfer belt 108.

Figure 4A:
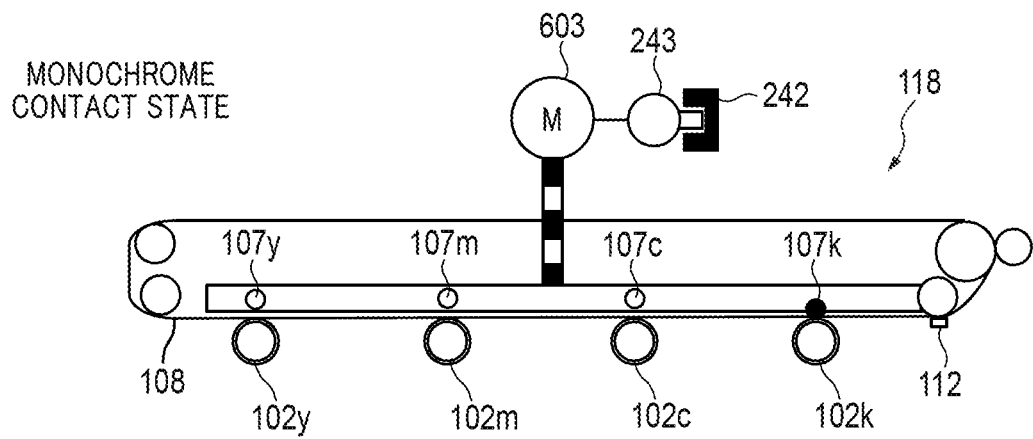
FIG. 4A through FIG. 4C are schematic views showing a belt-contact-state change unit of the image forming apparatus of FIG. 1.

FIG. 4A shows the state where the HP sensor 242 detects the HP flag 243 and is outputting ON. This state corresponds to a monochrome contact state where the primary transfer roller 107k contacts the photosensitive drum 102k through the intermediate transfer belt 108 and where the primary transfer rollers 107y, 107m, and 107c are out of contact with the photosensitive drums 102y, 102m, and 102c through the intermediate transfer belt 108.

Figure 4B:
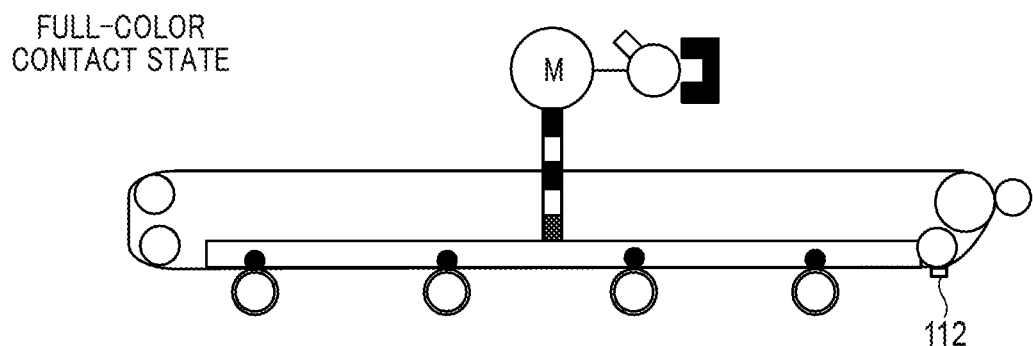

FIG. 4B shows a state where the HP flag 243 advances by predetermined first pulses from an OFF position where the HP sensor 242 loses the detection of the HP flag 243. This state corresponds to a full-color contact state where the primary transfer rollers 107y, 107m, 107c, and 107k of all the colors contact the photosensitive drums 102y, 102m, 102c, and 102k through the intermediate transfer belt 108.

Figure 4C:
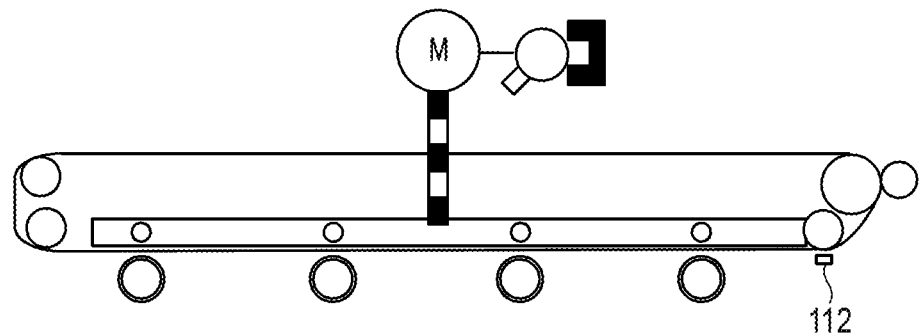

FIG. 4C shows a state where the HP flag 243 advances by predetermined second pulses from the above-mentioned OFF position of the HP flag 243. This state corresponds to a noncontact state where the primary transfer rollers 107y, 107m, 107c, and 107k of all the colors are out of contact with the photosensitive drums 102y, 102m, 102c, and 102k through the intermediate transfer belt 108.

At a time of start-up of the image forming apparatus 2000, the belt-contact-state change unit 118 is set to the monochrome contact state as an initializing operation. At a time of starting a monochrome image forming operation, the belt-contact-state change unit 118 keeps the monochrome contact state. At a time of starting a color image forming operation, the belt-contact-state change unit 118 changes to the full-color contact state. Moreover, when the right cover 126 is opened, the belt-contact-state change unit 118 changes to the noncontact state because the intermediate transfer belt 108 may be exchanged.

The density sensor 112 reads toner images of the respective colors that are superimposed on the intermediate transfer belt 108. The density sensor 112 is separated from the intermediate transfer belt 108 in the noncontact state (FIG. 4C) and is close to or contacts the intermediate transfer belt 108 in the monochrome contact state (FIG. 4A) or the full-color contact state (FIG. 4B).

An abnormality of the belt-contact-state change unit 118 is detected as follows. When ON of the HP sensor 242 is not detected within a predetermined first period during the change of the belt-contact-state change unit 118 from the full-color contact state or the noncontact state to the monochrome contact state, the CPU 212a determines that an abnormality has occurred in the belt-contact-state change unit 118. Moreover, when OFF of the HP sensor 242 is not detected within a predetermined second period during the change of the belt-contact-state change unit 118 from the monochrome contact state to the full-color contact state or the noncontact state, the CPU 212a determines that an abnormality has occurred in the belt-contact-state change unit 118. When an abnormality occurs in the belt-contact-state change unit 118, the image forming unit 3 cannot be operated normally. Accordingly, the abnormality of the belt-contact-state change unit 118 belongs to the first type that disables execution of a print image output operation. In addition, malrotations of the monochrome drum motor 600, color drum motor 601, and fixing motor 602 also belong to the first type.

Figure 5A:
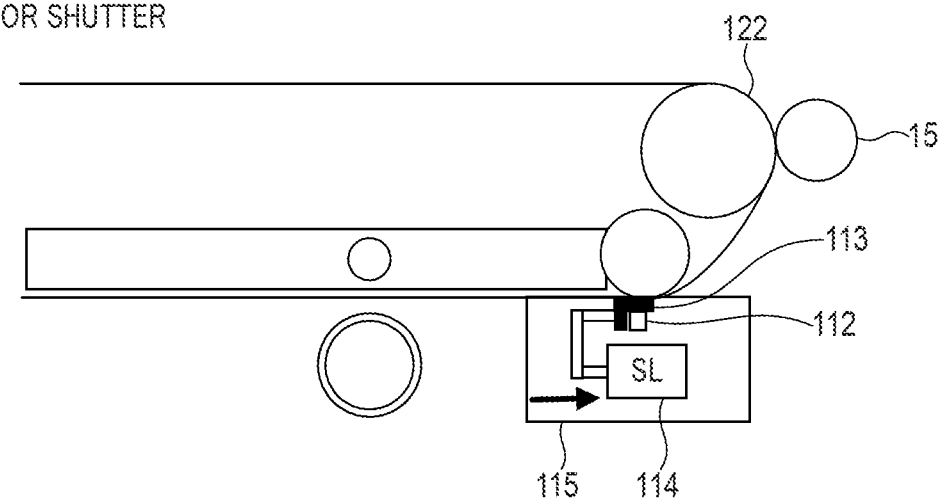
FIG. 5A and FIG. 5B are schematic views showing a density sensor unit and its periphery of the image forming apparatus of FIG. 1.
Figure 5B:
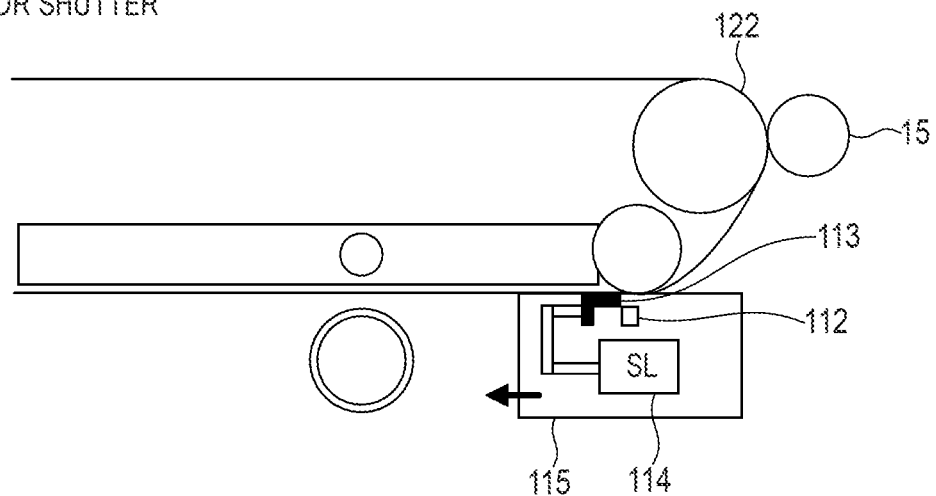

Next, examples of the second type will be described by referring to FIG. 5A through FIG. 10. FIG. 5A and FIG. 5B are schematic views showing a density sensor unit 115 and its periphery. The density sensor unit 115 has the density sensor 112, a sensor shutter 113, and a shutter solenoid 114. The sensor shutter 113 is provided in order to prevent a reading surface of the density sensor 112 from being contaminated by adhesion of the toner on the intermediate transfer belt 108. The shutter solenoid 114 drives the sensor shutter 113.

FIG. 5A shows a state where the sensor shutter 113 covers the reading surface of the density sensor 112. FIG. 5B shows a state where the sensor shutter 113 uncovers the reading surface of the density sensor 112. The position of the sensor shutter 113 is switched when the shutter solenoid 114 is turned ON and OFF. The density sensor unit 115 is used when an image-density-correction control process that determines an image forming condition so as to obtain suitable image density is executed.

Figure 6:
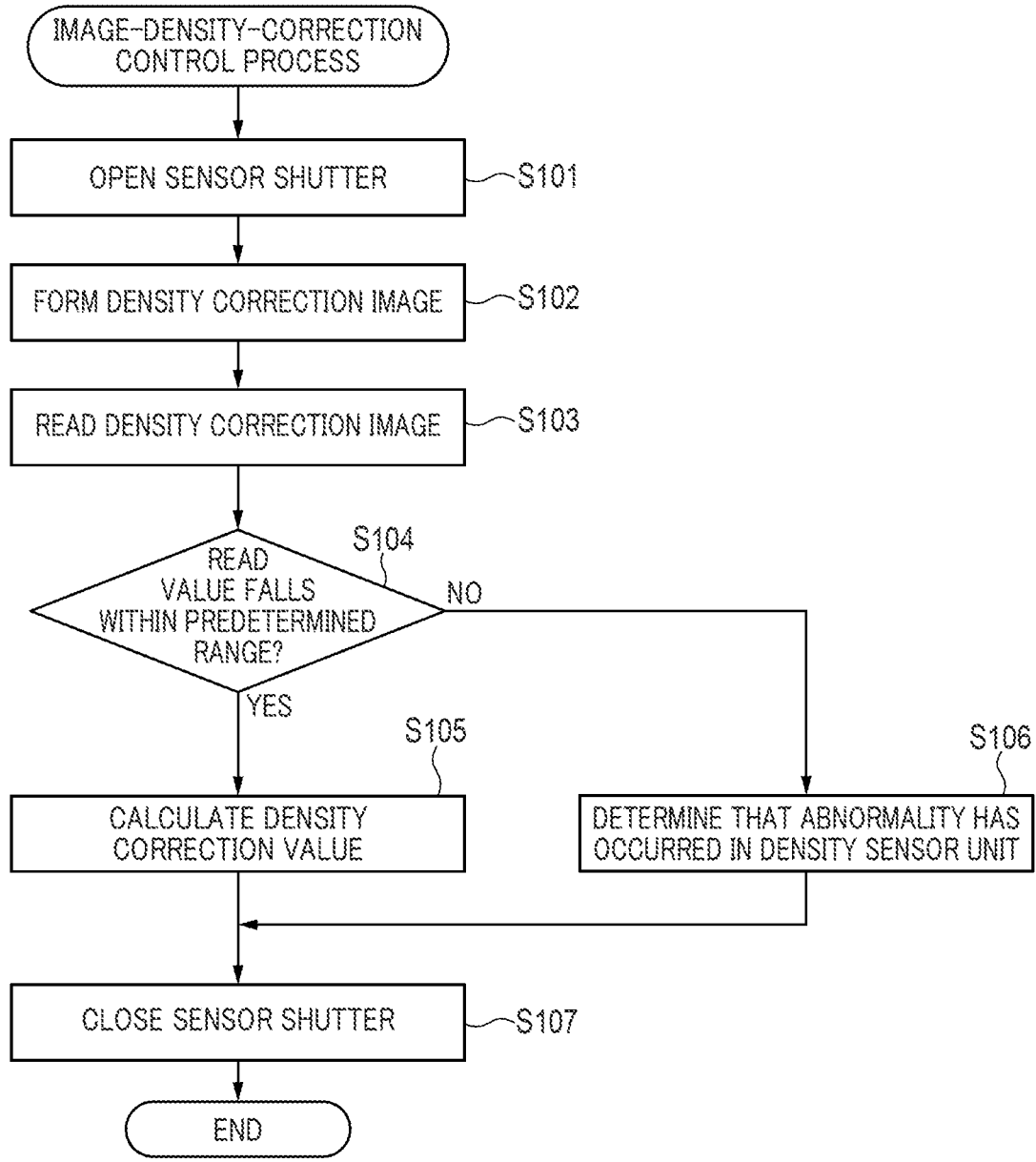
FIG. 6 is a flowchart showing an image-density-correction control process executed in the image forming apparatus of FIG. 1.

FIG. 6 is a flowchart showing the image-density-correction control process. This process is achieved when the CPU 121a develops a program stored in the ROM 212b to the RAM 212c and runs it. This processing is executed at certain time intervals after the power of the apparatus is turned ON, for example. Alternatively, this process is started by a start instruction of the image-density-correction control process from a user.

In a step S101, the CPU 212a opens the sensor shutter 113 first. In a step S102, the CPU 212a forms a density correction image on the intermediate transfer belt 108. In a step S103, the CPU 212a reads the density correction image on the intermediate transfer belt 108 with the density sensor 112. In a step S104, the CPU 212a determines whether the reading value by the density sensor 112 falls within a predetermined range. Then, when the reading value is in the predetermined range, the CPU 212a calculates a density correction value on the basis of the current reading value and updates the image forming condition with the calculated density correction value in a step S105.

In the meantime, when the reading value is not in the predetermined range, the CPU 212a determines that an abnormality has occurred in the density sensor unit 115 in a step S106. In this case, the density correction value is not calculated. Accordingly, the image forming condition is not updated but the image forming condition before executing the current image-density-correction control process is maintained. After the step S105 or the step S106, the CPU 212a closes the sensor shutter 113 in a step S107 and finishes the process shown in FIG. 6.

In this way, even if the density sensor unit 115 breaks down, the image output operation is executable by employing the image forming condition of the previous time continuously instead of repealing the function of the density sensor unit 115. Accordingly, the abnormality of the density sensor unit 115 belongs to the second type.

Next, an abnormality of the first sheet cassette 18a as another example of the second type will be described by referring to FIG. 7 through FIG. 10. Since the configurations of the four sheet cassettes 18a through 18d are mutually common, the first sheet cassette 18a is shown as a representative in FIG. 7 through FIG. 10.

Figure 7:
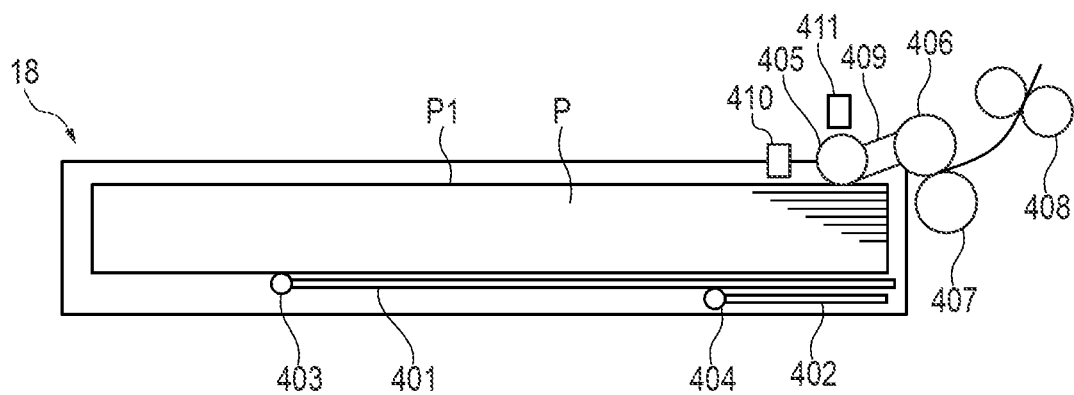
FIG. 7 is a schematic sectional view showing a sheet cassette of the image forming apparatus of FIG. 1.
Figure 8:
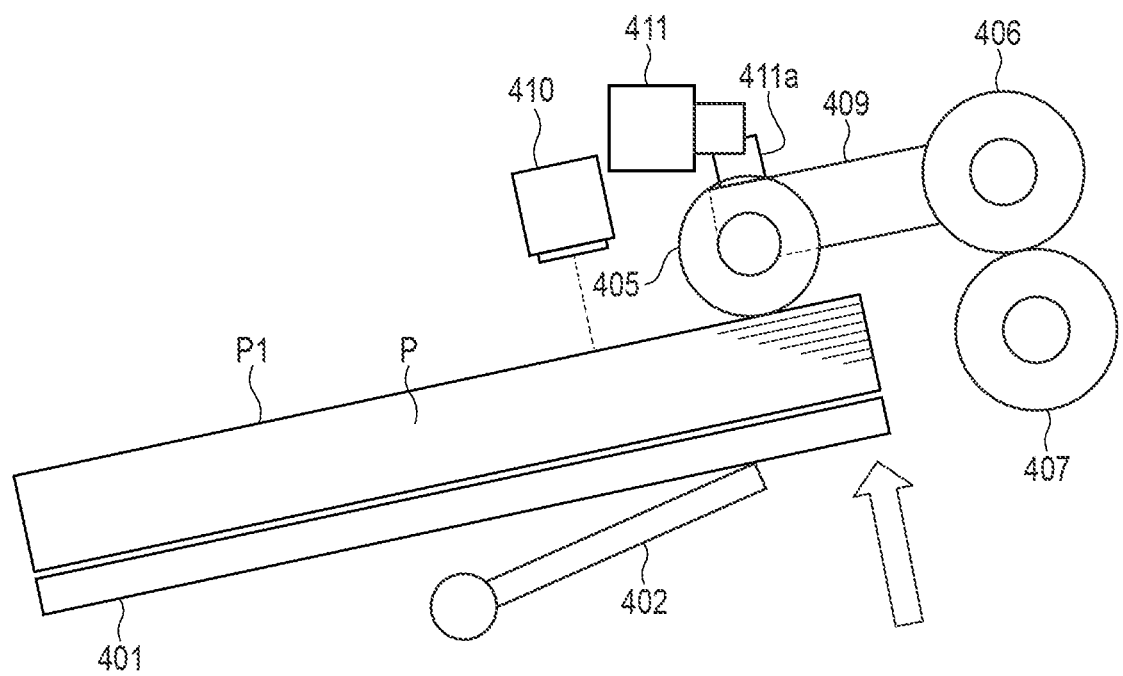
FIG. 8 is a schematic view showing a stacking tray and its periphery of the image forming apparatus of FIG. 1.
Figure 9:
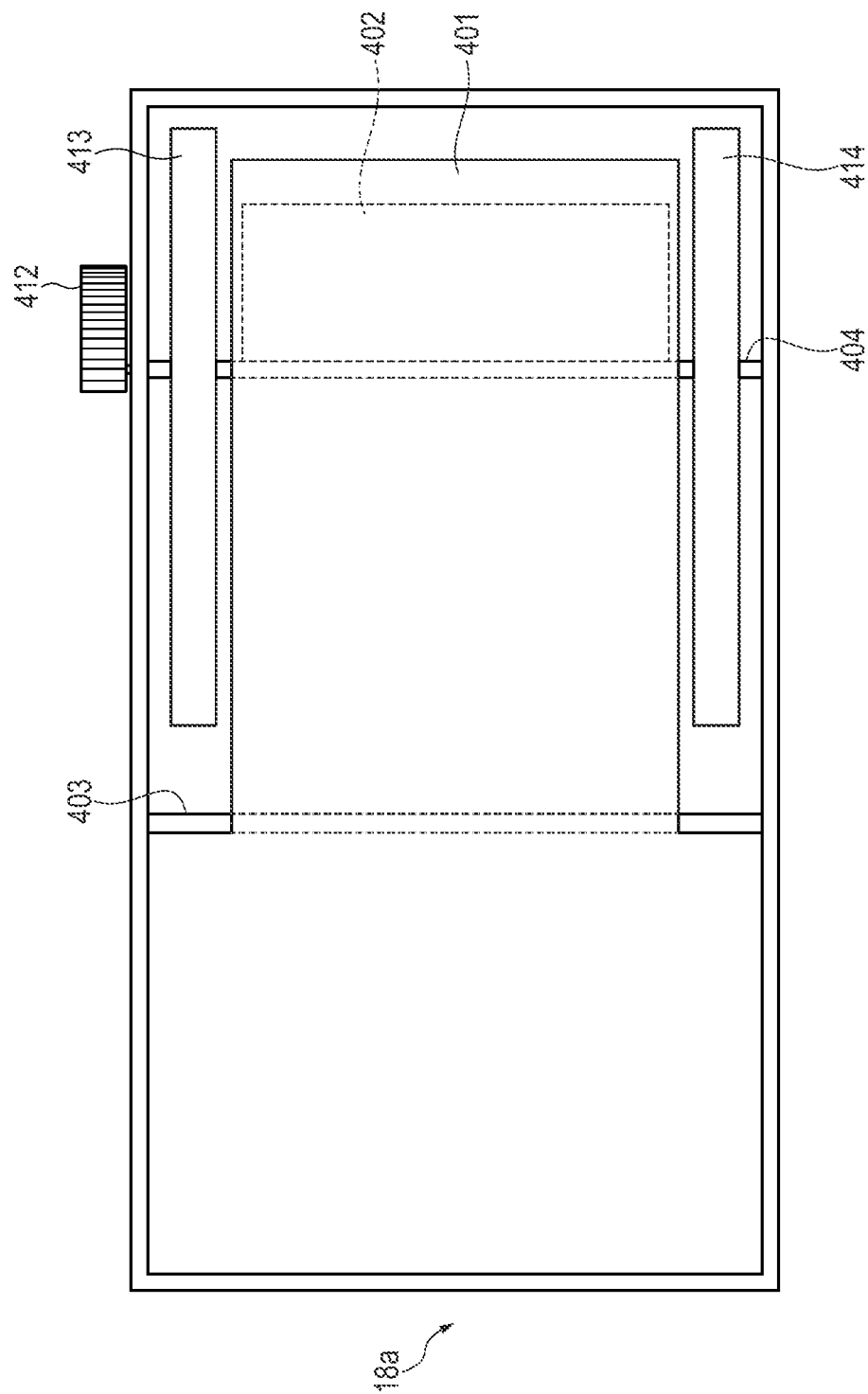
FIG. 9 is a top plan view showing the sheet cassette of FIG. 7.

FIG. 7 is a schematic sectional view of the first sheet cassette 18a. The first sheet cassette 18a is provided with a stacking tray 401 on which the sheets P are stacked. FIG. 8 is a schematic view showing the stacking tray 401 and its periphery. FIG. 9 is a top plan view showing the first sheet cassette 18a. The stacking tray 401 is supported so as to be rotatable around a supporting shaft 403. That is, the stacking tray 401 is elevatable in a vertical direction. A pickup roller 405 arranged above the first sheet cassette 18a contacts the sheet P stacked on the stacking tray 401 and feeds the sheet P. The first sheet cassette 18a is provided with a feed roller 406 that rotates in the same direction as the pickup roller 405 and a retard roller 407 that is in pressure contact with the feed roller 406 with a predetermined tension. Certain torque in a backward rotation direction opposite to a forward rotation direction corresponding to a sheet conveyance direction can be given to the retard roller 407 through a torque limiter (not shown). When the retard roller 407 receives torque of less than a predetermined value, the torque limiter gives the certain torque in the backward rotation direction to the retard roller 407. When the retard roller 407 receives torque equal to or more than the predetermined value, the torque limiter intercepts transfer of the certain torque. Accordingly, the retard roller 407 is rotatable in both directions.

An arm 409 pivots in the vertical direction around a shaft (not shown) of the feed roller 406. The pickup roller 405 is supported by the arm 409 rotatably. The top sheet P1 fed by the pickup roller 405 is separated from the second and subsequent sheets P by a separator mechanism of a retarded separation method that consists of the feed roller 406 and retard roller 407 and is conveyed. The separated sheet P1 is conveyed with a drawing roller pair 408 downstream. The second and subsequent sheets P are returned to the first sheet cassette 18a by the retard roller 407.

Moreover, as shown in FIG. 7 and FIG. 8, a sheet sensor 410 and a top face sensor 411 are arranged above the first sheet cassette 18a. The sheet sensor 410 is a reflection type photosensor that detects the presence or absence of the sheet P on the stacking tray 401. The top face sensor 411 detects whether the pickup roller 405 is at a predetermined height. When the stacking tray 401 rises, the top sheet P1 pushes up the pickup roller 405. When the pickup roller 405 reaches a predetermined height position, the top face sensor 411 detects the pickup roller 405 and outputs an ON signal. Moreover, when a top face height of the sheets P becomes lower than the predetermined height because the sheets P are sequentially fed, the top face sensor 411 outputs an OFF signal.

The CPU 212a drives the first lifter motor 604a in response to the OFF signal of the top face sensor 411 so as to raise the stacking tray 401 until the output of the top face sensor 411 becomes ON. In this embodiment, the output of the top face sensor 411 becomes ON when a shielding flag 411a is inserted into a detection part of the photosensor. The output of the top face sensor 411 becomes OFF when the shielding flag 411a exits from the detection part of the photosensor so as not to shield.

Moreover, an arm plate 402 is arranged under the stacking tray 401 as shown in FIG. 7. The arm plate 402 is a pivotable member that pivots around a rotation shaft 404 and elevates the stacking tray 401. The rotation shaft 404 is supported by a bearing (not shown) provided in the first sheet cassette 18a rotatably.

As shown in FIG. 9, the arm plate 402 is connected to a fan gear 412, which is arranged at a back side (an upper side in FIG. 9) in a mounting direction (width direction) that intersects perpendicularly with a sheet conveyance direction in the first sheet cassette 18a, through the rotation shaft 404. Side regulating plates 413 and 414 regulate the position of the sheets P stacked on the stacking tray 401 in the mounting direction. The first sheet cassette 18a is detachable from and attachable to the image forming apparatus 2000.

Figure 10:
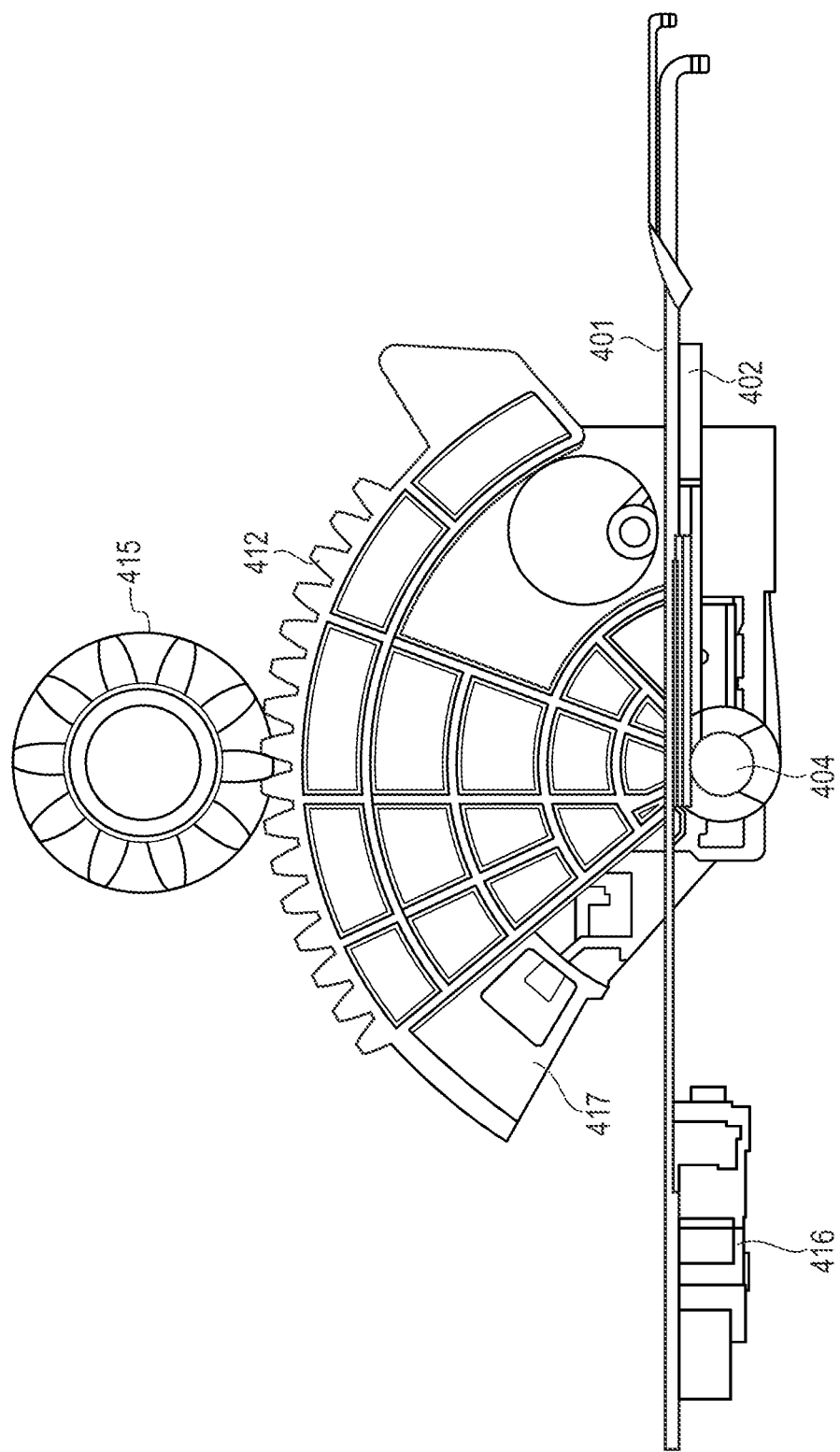
FIG. 10 is a view showing a periphery of a fan gear shown in FIG. 9 viewed from a front side.

FIG. 10 is a view showing the fan gear 412 and its periphery viewed from a near side (lower side in FIG. 9). When the first sheet cassette 18a is attached to the image forming apparatus 2000, the fan gear 412 engages with a lifter gear 415 arranged at the image forming apparatus 2000. The lifter gear 415 is driven by the first lifter motor 604a and rotates clockwise in FIG. 10. Rotation of the lifter gear 415 is transferred to the arm plate 402 through the fan gear 412 and the rotation shaft 404, the arm plate 402 rotates upward, and, thereby, the stacking tray 401 rises. It should be noted that the stacking tray 401 cannot be dropped by the first lifter motor 604a. When a user pulls out the first sheet cassette 18a from the image forming apparatus 2000, engagement of the fan gear 412 and the lifter gear 415 is released, and the stacking tray 401 drops to a lowest position by self-weight.

Moreover, the rise sensor 416 is a photosensor that detects rising of the stacking tray 401 by a predetermined amount from the lowest position by detecting rotation of the fan gear 412 by a predetermined angle. A rise detection flag 417 is formed at the tip of the fan gear 412 in the counterclockwise direction in FIG. 10. When the fan gear 412 rotates by a predetermined angle, the rise detection flag 417 obstructs the optical path of the rise sensor 416, which turns the rise sensor 416 ON. The CPU 212a determines that the stacking tray 401 has risen by the predetermined amount when the signal from the rise sensor 416 is turned ON.

Next, detection of an abnormality of the rising motion of the stacking tray 401 will be described. As mentioned above, when the stacking tray 401 drops to the lowest position by the switching operation of the first sheet cassette 18a, the top face sensor 411 is turned OFF. Alternatively, when the sheets P are consumed by a predetermined amount by execution of the image forming operation and the pickup roller 405 drops, the top face sensor 411 is turned OFF. When the top face sensor 411 is turned OFF, the CPU 212a raises the stacking tray 401 by driving the first lifter motor 604 until the top face sensor 411 is turned ON. When the top face sensor 411 is not turned ON within a third predetermined period after starting this raising motion, the CPU 212a determines that an abnormality of the raising motion of the stacking tray 401 has occurred.

When the abnormality of the raising motion of the stacking tray 401 occurs, the first sheet cassette 18a including the stacking tray 401 cannot be used. However, in the embodiment, since the plurality of sheet cassettes 18a through 18d are employed, the image output operation is executable using another sheet cassette 18b, 18c, or 18d as an alternative. Accordingly, the abnormality (lift-up abnormality) of the raising motion of the stacking tray 401 (i.e., the abnormality of a sheet cassette) belongs to the second type.

Since the HP sensor 242, density sensor 112, and top face sensor 411 detect occurrence of an abnormality in the image forming apparatus 2000 by cooperating with the CPU 212a, they play a role of a detection unit in the present invention.

FIG. 11 is a view showing an example of a type data table. This type data table prescribes a relation between an error code, a type, and a content of an abnormality, and is beforehand stored in the ROM 212b.

When motion control is not completed normally and a certain abnormality is detected within the image forming apparatus 2000, the CPU 212a issues an error code. The CPU 212a reports the error code by displaying it on the screen of the operation unit 1000 or transmitting it to a call center through the LAN 1001. For example, when an abnormality of the belt-contact-state change unit 118 is detected, an error code "E006" is reported.

As shown in FIG. 11, "1" or "2" is assigned to each error code as information which shows the type of an abnormality. For example, the first type "1" is assigned to the error code "E006" that shows the abnormality of the belt-contact-state change unit 118. Moreover, the second type "2" is assigned to the error codes "E011" through "E014" that show the abnormalities (cassette lift-up abnormalities) of the sheet cassettes 18a through 18d and to the error code "E015" that shows the abnormality of the density sensor unit 115.

It should be noted that the item of the content of detected abnormality in the type data table is described so as to understand a content of an error code easily. Accordingly, the ROM 212b may actually store only the error codes and the information showing the abnormality types.

Figure 12:
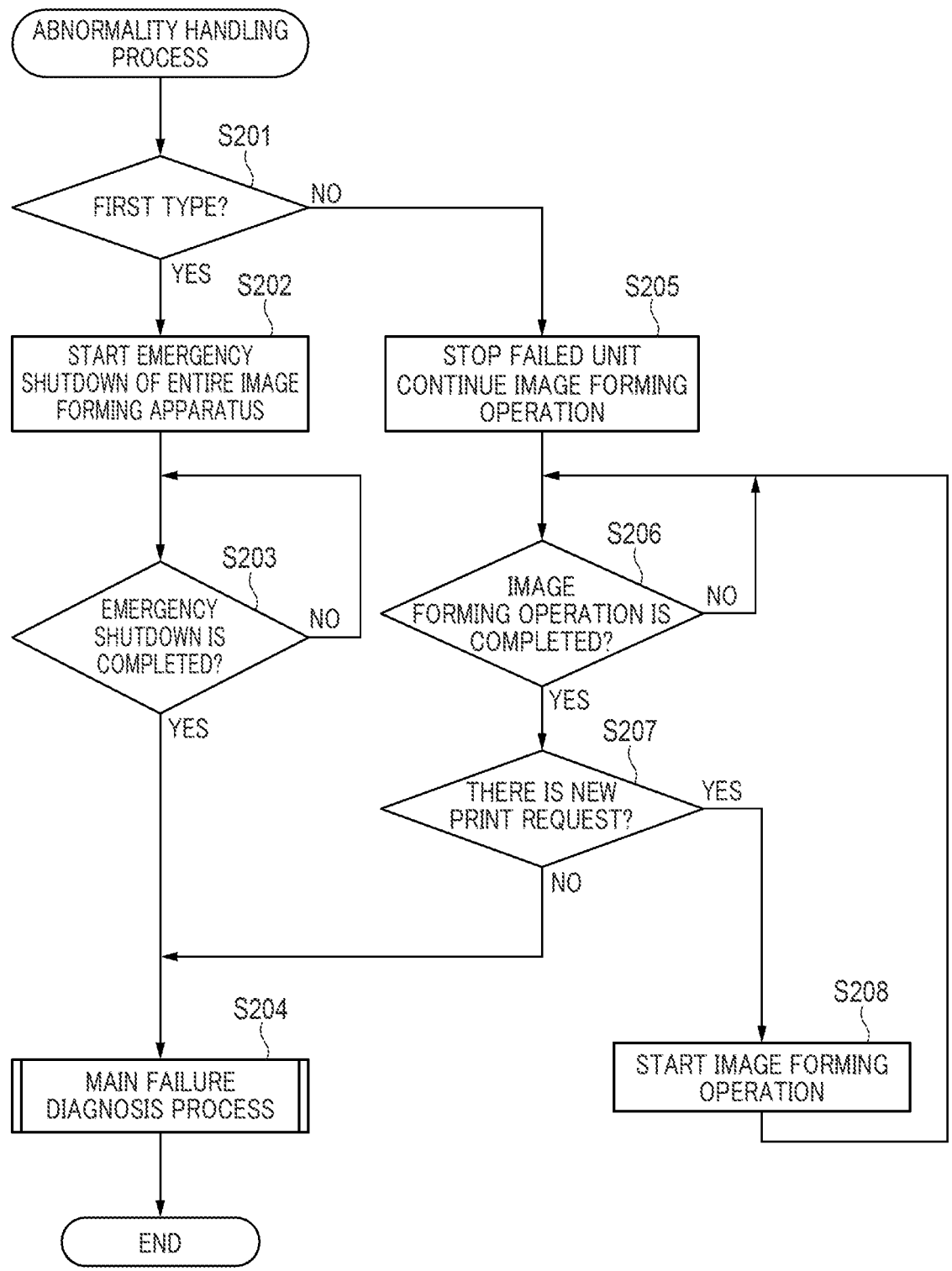
FIG. 12 is a flowchart showing an abnormality handling process executed in the image forming apparatus of FIG. 1.

FIG. 12 is a flowchart showing an abnormality handling process. This process is achieved when the CPU 121a develops a program stored in the ROM 212b to the RAM 212c and runs it. This process is started when a new error code is issued, for example.

In a step S201, the CPU 212a first determines whether the abnormality occurred at this time belongs to the first type on the basis of the issued error code by referring to the type data table (FIG. 11). For example, when the error code is "E006", the CPU 212a determines that the abnormality belongs to the first type.

When the abnormality occurred at this time belongs to the first type, the image output operation cannot be performed. Accordingly, the CPU 212a starts emergency shutdown of the entire image forming apparatus 2000 in a step S202. When there is the image forming operation under execution, the image forming operation is also stopped. After that, the CPU 212a waits until the emergency shutdown of the entire image forming apparatus 2000 is completed in a step S203. When the emergency shutdown is completed, the process proceeds to a step S204.

In the meantime, when the abnormality occurred at this time does not belong to the first type, it belongs to the second type and the image output operation is executable by an alternative etc. Accordingly, in a step S205, the CPU 212a executes a stop process for the abnormality occurrence place, i.e., the unit of which the failure is detected. However, the CPU 212a continues the image forming operation when the image forming operation (including its preparation operation) is executing. In this step, the image forming operation under execution and an image formation preparation operation at power source start-up are not stopped.

After that, the CPU 212a waits until the image forming operation under execution is completed in a step S206. When the image forming operation under execution is completed, the process proceeds to a step S207. In the step S207, the CPU 212a determines whether there is an unexecuted print request, i.e., a new image formation request. This is because a next image formation request may be input during execution of an image forming operation. Then, when there is a new image formation request, the CPU 212a starts an image forming operation corresponding to the new image formation request in a step S208 and returns the process to the step S206.

In the meantime, when there is no new image formation request, the process proceeds to the step S204. In the step S204, the CPU 212a executes a main failure diagnosis process (mentioned later by referring to FIG. 13) and finishes the process shown in FIG. 12.

Figure 13:
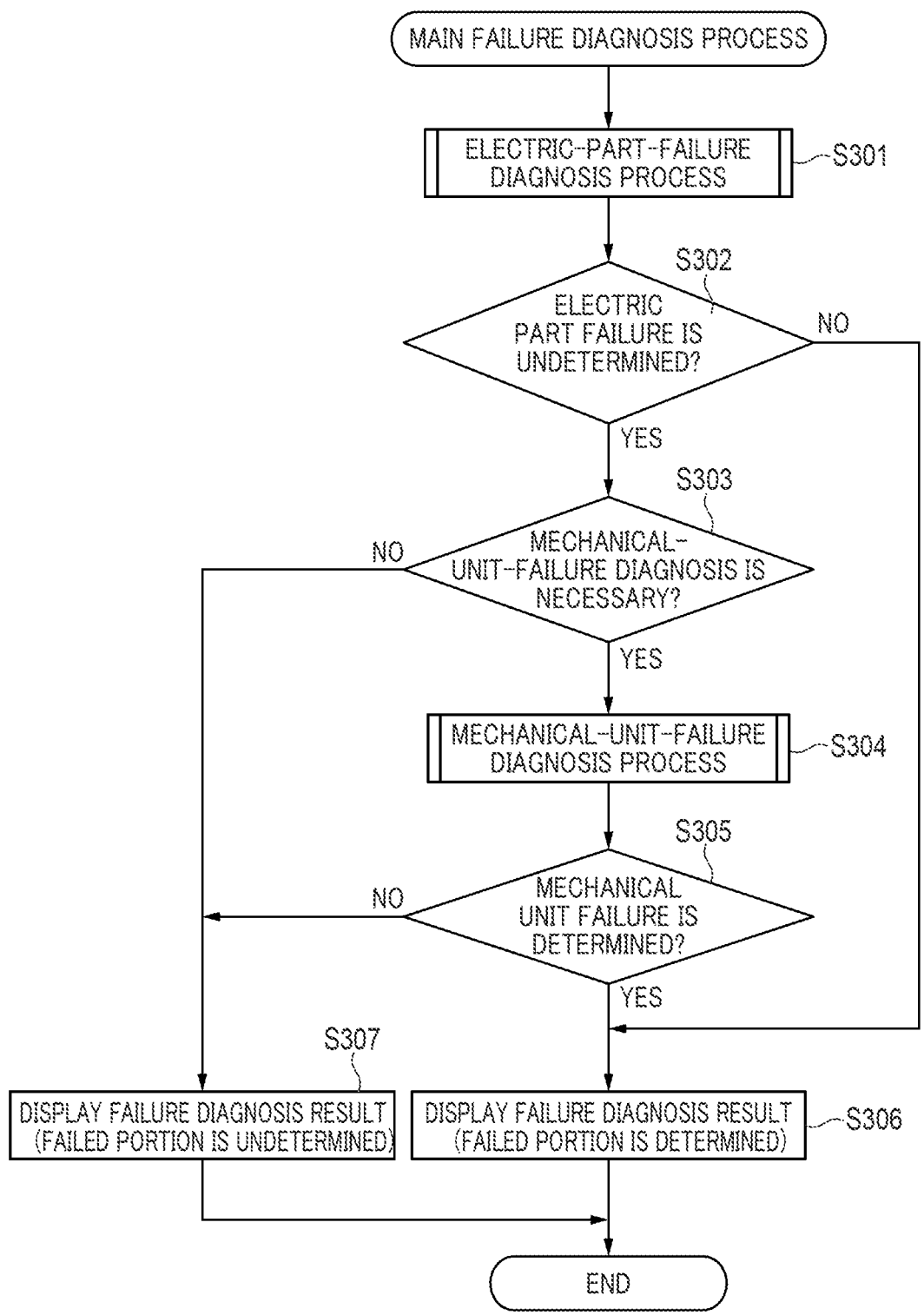
FIG. 13 is a flowchart showing a main failure diagnosis process executed in the image forming apparatus of FIG. 1.

FIG. 13 is a flowchart showing the main failure diagnosis process executed in the step S204 in FIG. 12. This process is executed for every abnormality detected place (every error code). First, the CPU 212a executes an electric failure diagnosis process (mentioned later by referring to FIG. 17) in a step S301. In a step S302, the CPU 212a determines whether a failure of an electric part is not determined (a failure of an electric part is not specified) as a result of the electric failure diagnosis process. When a failure of an electric part is not determined, the CPU 212a proceeds with the process to a step S303. When a failure of an electric part is determined, the CPU 212a proceeds with the process to a step S306.

In the step S303, the CPU 212a determines whether a mechanical-unit-failure diagnosis is required. The mechanical-unit-failure diagnosis is a process for specifying a failed portion in a mechanical structure consisting of gears etc. that are driven by a motor. The CPU 212a determines whether the mechanical-unit-failure diagnosis is required from an issued error code by referring to the type data table (FIG. 11). For example, since the fan 300 (FIG. 1) that is driven by a motor has no mechanical structure consisting of gears etc., the mechanical-unit-failure diagnosis is unnecessary. Accordingly, when the error code is "E005", it is determined that the mechanical-unit-failure diagnosis is unnecessary. In the meantime, since the belt-contact-state change unit 118 has a mechanical structure, it is determined that the mechanical-unit-failure diagnosis is required when the error code is "E006".

Figure 18:
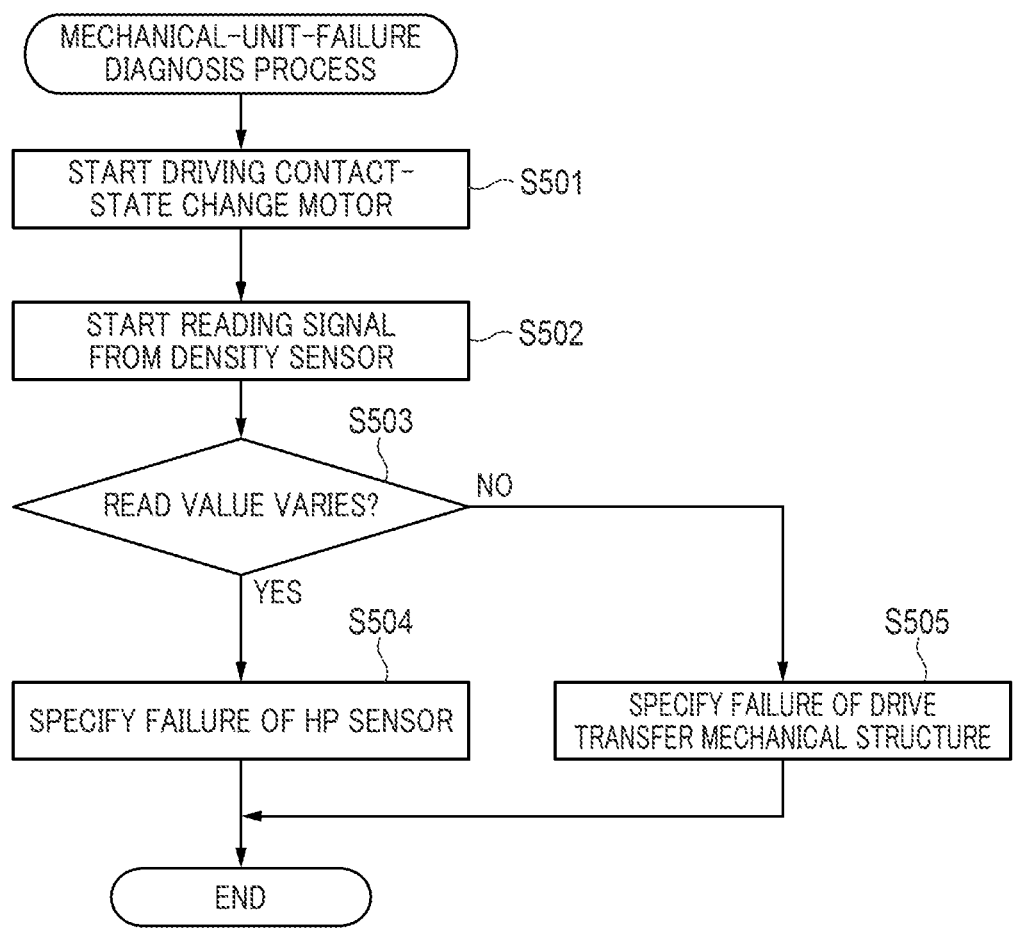
FIG. 18 is a flowchart showing a mechanical-unit-failure diagnosis process executed in the image forming apparatus of FIG. 1.
Figure 19:
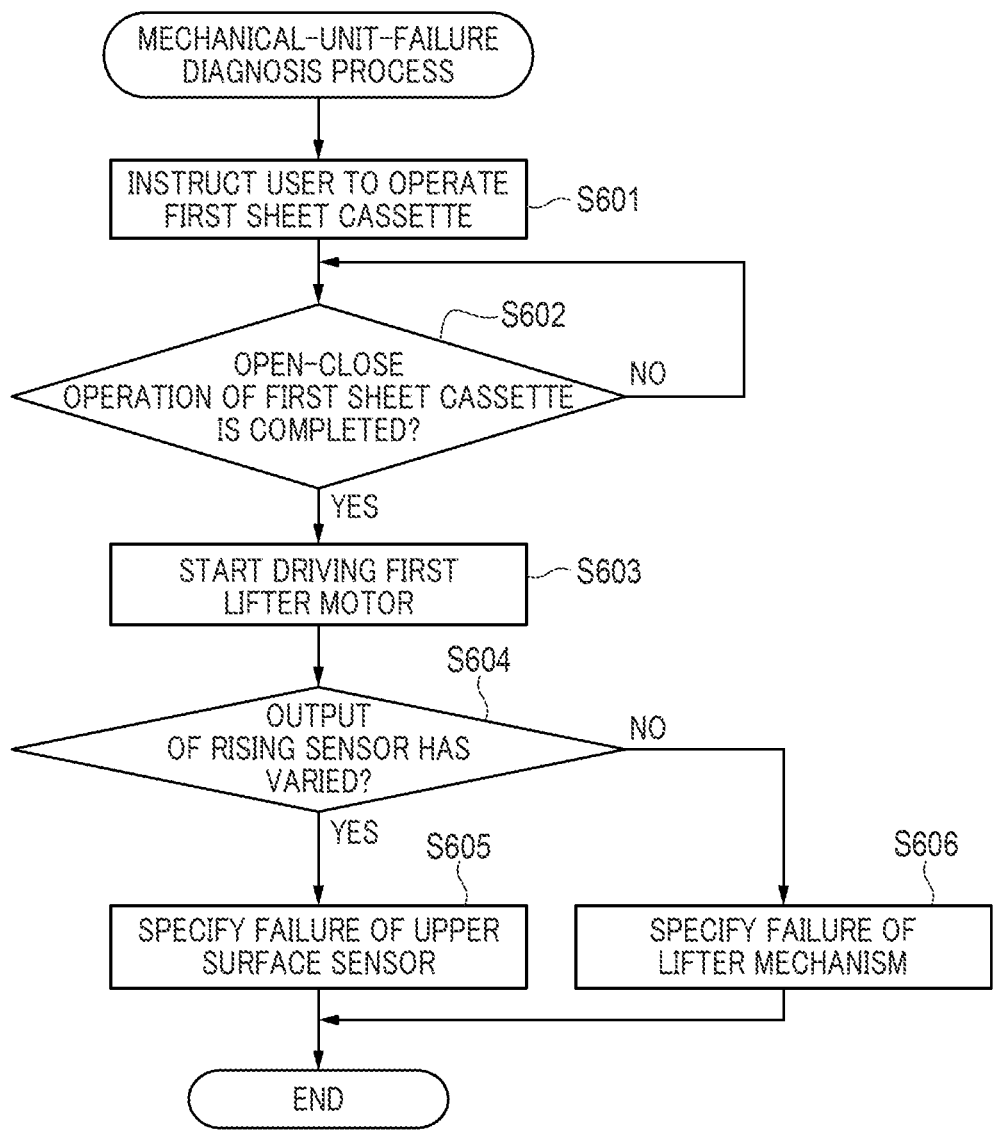
FIG. 19 is a flowchart showing a mechanical-unit-failure diagnosis process executed in the image forming apparatus of FIG. 1.

When determining that the mechanical-unit-failure diagnosis is unnecessary, the CPU 212a proceeds with the process to a step S307. In the meantime, when determining that the mechanical-unit-failure diagnosis is required, the CPU 212a executes the mechanical-unit-failure diagnosis process in a step S304. The mechanical-unit-failure diagnosis is executed in response to the current error code. Examples of the mechanical-unit-failure diagnosis process are shown in FIG. 18 and FIG. 19 as mentioned later.

Following the step S304, the CPU 212a determines whether a failure of the mechanical unit is determined (whether a failure of the mechanical unit is specified) as a result of executing the failure diagnosis process in a step S305. The CPU 212a proceeds with the process to the step S306 when a failure of the mechanical unit is determined. When a failure of the mechanical unit is not determined, the process proceeds to the step S307.

Figure 14A:
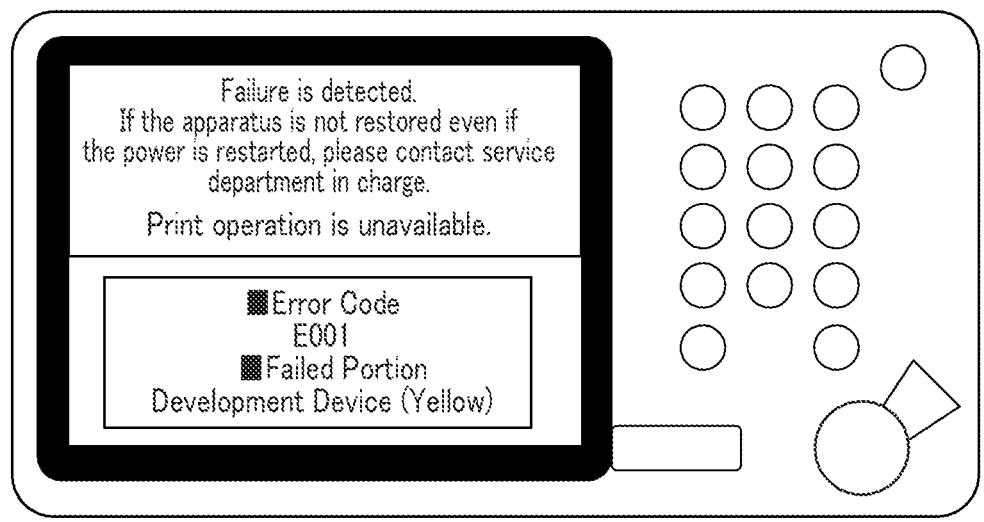
FIG. 14A and FIG. 14B are views showing report screens displayed on an operation unit of the image forming apparatus of FIG. 1.
Figure 14B:
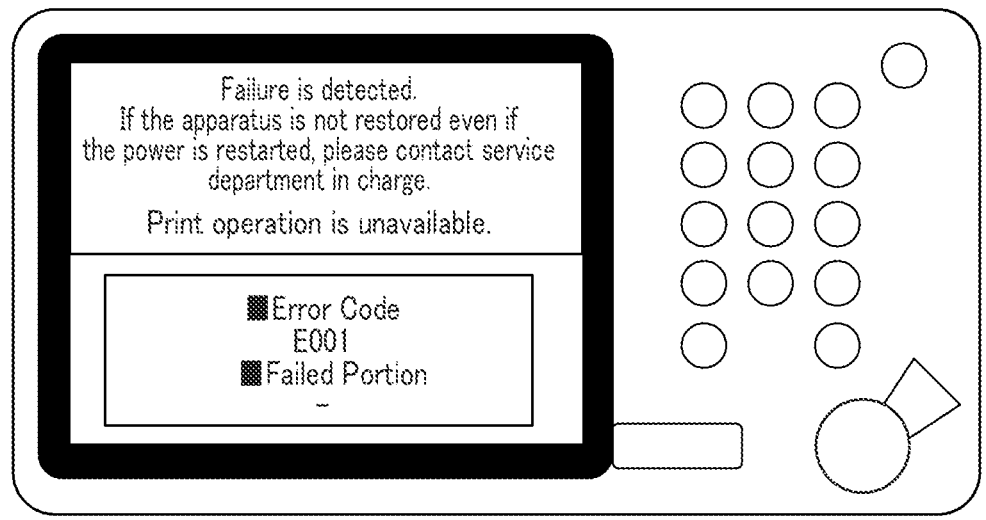
Figure 15A:
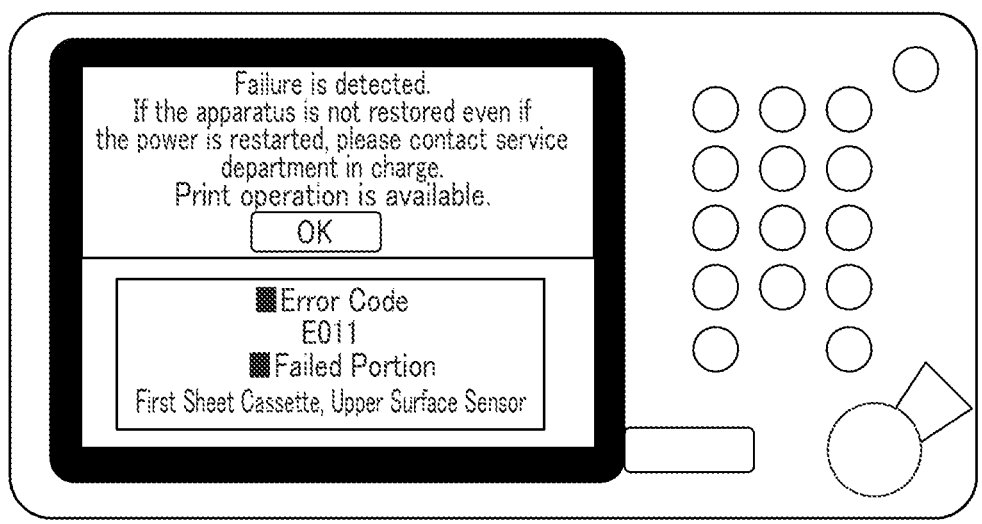
FIG. 15A and FIG. 15B are views showing report screens displayed on the operation unit of the image forming apparatus of FIG. 1.

FIG. 14A, FIG. 14B, FIG. 15A, and FIG. 15B are views showing notification screen examples displayed on the operation unit 1000. When the process proceeds to the step S306 via the step S305, the CPU 212a reports the specified failed portion as shown in FIG. 14A or FIG. 15A. At that time, an error code and a concrete name of the failed portion are also displayed. Particularly, when the abnormality belongs to the first type, the information is reported in the manner shown in FIG. 14A. When the abnormality belongs to the second type, the information is reported in the manner shown in FIG. 15A. The screen example of FIG. 14A shows that a print operation is unavailable. The screen example of FIG. 15A shows that a print operation is available. It should be noted that the information may be reported as a voice message in the above-mentioned cases and the following cases. Moreover, when the process directly proceeds to the step S306 from the step S302, the CPU 212a reports the failed portion that has been specified by the electric failure diagnosis process (FIG. 17) in the same manner as FIG. 14A or FIG. 15A.

Figure 15B:
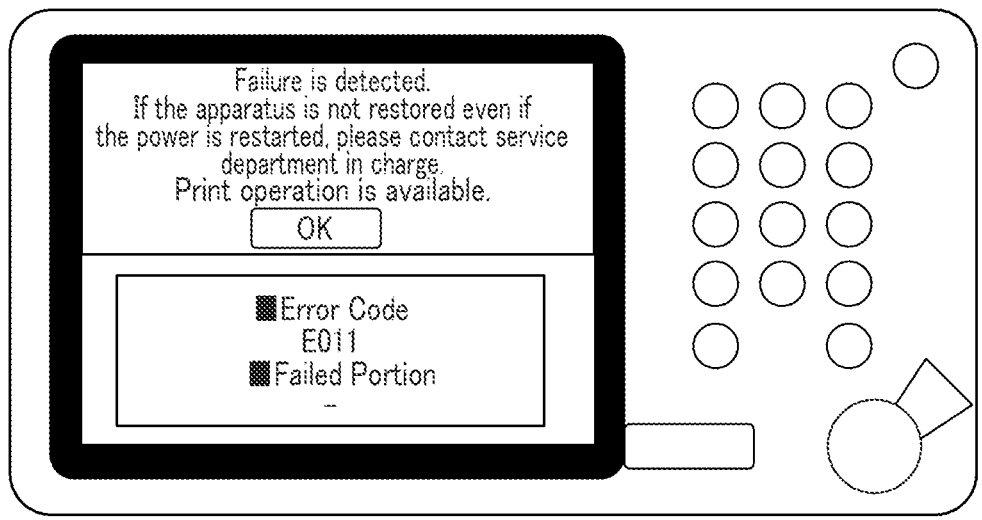

When the process proceeds to the step S307 via the step S305, the CPU 212a reports an error code and a symbol "-", which means that a failed portion has not been specified, as shown in FIG. 14B or FIG. 15B. A user understands that the abnormality has been detected by the error code, but the concrete failed portion has not been specified. Particularly, when the abnormality belongs to the first type, the information is reported in the manner shown in FIG. 14B. When the abnormality belongs to the second type, the information is reported in the manner shown in FIG. 15B. The screen example of FIG. 14B shows that a print operation is unavailable. The screen example of FIG. 15B shows that a print operation is available. the CPU 212a finishes the process shown in FIG. 13 after the step S306 or the step S307.

An abnormality may be detected because of temporary variation factors of the environment where the image forming apparatus 2000 is installed, such as temporary fluctuation of power supply voltage, dew condensation and a temperature rise in the apparatus. In such a case, if a temporary factor is solved, the apparatus may return to a normal state. Accordingly, the message that prompts a user to reboot of the power source is also displayed in each of the screens of FIG. 14A, FIG. 14B, FIG. 15A, and FIG. 15B.

FIG. 16 is a view showing an example of an electric failure diagnosis table. The electric failure diagnosis table is stored in the ROM 212b. In the electric failure diagnosis table, diagnosis targets, such as motors and solenoids, and corresponding check points in the power source section, signal output section, control circuit section, and load operation section are prescribed.

Figure 17:
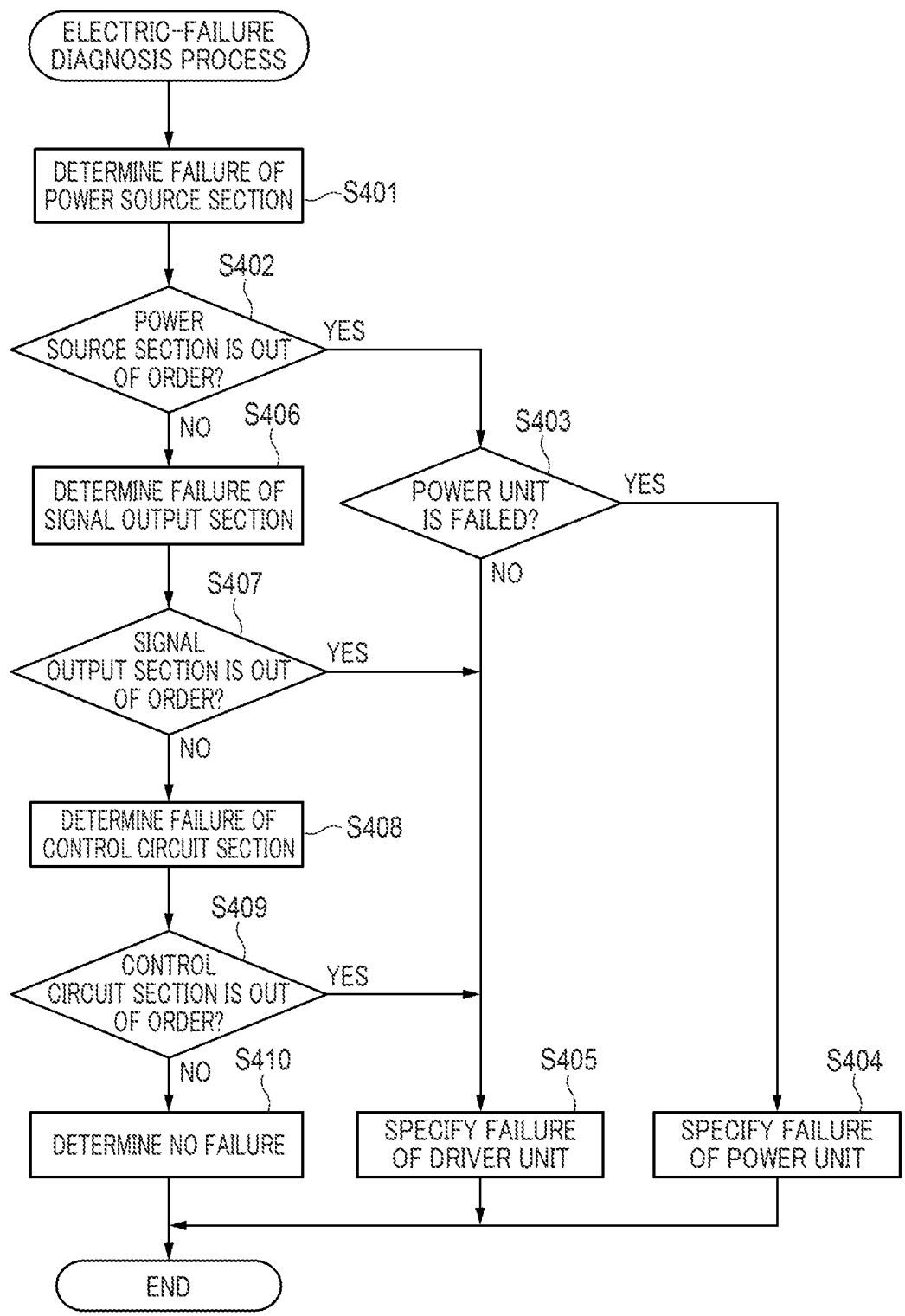
FIG. 17 is a flowchart showing an electric failure diagnosis process executed in the image forming apparatus of FIG. 1.

FIG. 17 is a flowchart showing the electric failure diagnosis process executed in the step S301 in FIG. 13. It should be noted that electric parts relevant to the drive of the contact-state change motor 603 are described as examples.

First, the CPU 212a checks failure of the power source section in a step S401 and determines whether the power source section is out of order in a step S402. Then, when the power source section is out of order, the CPU 212a proceeds with the process to a step S403. When the power source section is not out of order, the CPU 212a proceeds with the process to a step S406. In the step S403, the CPU 212a determines whether the power unit 200 is out of order. When the power unit 200 is out of order, the CPU 212a proceeds with the process to a step S404. When the power unit 200 is not out of order, the CPU 212a proceeds with the process to a step S405.

Specifically, the CPU 212a checks failure of the power source section as follows in the steps S401 through S403. Since a +24V_B_FU power source supplies the power to the contact-state change motor 603 according to the electric failure diagnosis table (FIG. 16), the CPU 212a checks output of the +24V_B_FU power source. Accordingly, the first voltage detector 303a of the driver unit 230 detects whether the voltage of +24V_B prior to passing the fuse FU4 is equal to or more than a first threshold th1. In this embodiment, the first threshold th1 shall be 18V.

The detection result of the first voltage detector 303a is transmitted to the CPU 212a through the ASIC 231. The CPU 212a determines a failed portion according to the detection result of the first voltage detector 303a. When the detection result shows that the voltage of +24V_B is less than the first threshold th1, the CPU 212a determines that the output of the power source section (the power unit 200) is abnormal. That is, the CPU 212a determines that the path (fuse FU2) that outputs the voltage of +24V_B of the power unit 200 is a failed portion. In this case, the CPU 212a specifies the power unit 200 as a failed part (power output abnormality).

When the voltage of +24V_B is normal, the second voltage detector 303b of the driver unit 230 detects whether the voltage of +24V_B_FU that passed the fuse FU4 is equal to or more than a second threshold th2. The second threshold th2 is equal to the first threshold th1, for example. The second voltage detector 303b performs a detection process like the first voltage detector 303a and transmits a detection result to the CPU 212a through the ASIC 231. The CPU 212a determines whether the voltage of +24V_B_FU is normal according to the detection result of the second voltage detector 303b. That is, the CPU 212a determines that the voltage of +24V_B_FU is abnormal when the voltage of +24V_B_FU is less than the second threshold th2. When determining that the voltage of +24V_B_FU is abnormal, the CPU 212a determines that a failed portion is the fuse FU4. In this case, the CPU 212a specifies the driver unit 230 as a failed part. When determining that both the voltages of +24V_B and +24V_B_FU are normal (the voltage of +24V_B is equal to or more than the first threshold th1 and the voltage of +24V_B_FU is equal to or more than the second threshold th2), the CPU 212a determines that the power source section is normal.

The above description is summarized as follows. As a result of the determination in the step S402, when the voltage of +24V_B is less than the first threshold th1 or the voltage of +24V_B_FU is less than the second threshold th2, the CPU 212a proceeds with the process to the step S403. When the voltage of +24V_B is equal to or more than the first threshold th1 and the voltage of +24V_B_FU is equal to or more than the second threshold th2, the CPU 212a determines that the power source section is normal and proceeds with the process to the step S406.

In the step S403, the CPU 212a determines whether the power unit 200 is out of order. When the voltage +24V_B is less than the first threshold th1, the CPU 212a proceeds with the process to the step S404 and specifies the power unit 200 as a failed portion. Moreover, when the voltage of +24V_B is equal to or more than the first threshold th1 and the voltage of +24V_B_FU is less than the second threshold th2, the CPU 212a proceeds with the process to the step S405 and specifies that a failed portion is the driver unit 230.

Next, the CPU 212a checks failure of the signal output section in the step S406 and determines whether the signal output section is out of order in a step S407. Then, when the signal output section is out of order, the CPU 212a proceeds with the process to the step S405. When the signal output section is not out of order, the CPU 212a proceeds with the process to a step S408.

Specifically, the CPU 212a checks failure of the signal output section as follows in the steps S406 and S407. In order to check a failed portion in the signal output section, the CPU 212a checks the motor control signals transmitted to the first motor driver 236a from the motor controller 234 of the ASIC 231. The motor control signals include signals about a rotational direction, speed, and driving mode of the motor. The CPU 212a determines that the motor control signal of the signal output section of the contact-state change motor 603 is a contact-state-change-motor control signal on the basis of the electric failure diagnosis table (FIG. 16). The CPU 212a sets the ASIC 231 so that the contact-state-change-motor control signal will be output at a High level.

The first signal detector 305a of the driver unit 230 compares the contact-state-change-motor control signal with a third threshold th3. The third threshold th3 shall be 2.8V. The comparison result of the first signal detector 305a is transmitted to the CPU 212a through the ASIC 231. The CPU 212a checks the output state according to the comparison result of the first signal detector 305a. When the comparison result shows that the contact-state-change-motor control signal is equal to or more than the third threshold th3, the CPU 212a temporarily determines that the contact-state-change-motor control signal is not abnormal. When the comparison result shows that the contact-state-change-motor control signal is less than the third threshold th3, the CPU 212a determines that the contact-state-change-motor control signal is abnormal. When determining that the contact-state-change-motor control signal is abnormal, the CPU 212a specifies the motor controller 234 as a failed portion. In this case, the CPU 212a specifies the driver unit 230 as a failed part.

Next, the CPU 212a sets the ASIC 231 so that the contact-state-change-motor control signal will be output at a Low level. The first signal detector 305a checks the contact-state-change-motor control signal by comparing the contact-state-change-motor control signal with a fourth threshold th4. The fourth threshold th3 shall be 0.8V. The comparison result of the first signal detector 305a is transmitted to the CPU 212a through the ASIC 231. The CPU 212a checks the output state according to the comparison result of the first signal detector 305a. When the comparison result shows that the contact-state-change-motor control signal is less than the fourth threshold th4, the CPU 212a temporarily determines that the contact-state-change-motor control signal is not abnormal. When the comparison result shows that the contact-state-change-motor control signal is equal to or more than the fourth threshold th4, the CPU 212a determines that the contact-state-change-motor control signal is abnormal. When determining that the contact-state-change-motor control signal is abnormal, the CPU 212a specifies the motor controller 234 as a failed portion. In this case, the CPU 212a specifies the driver unit 230 as a failed part.

When temporarily determining that the contact-state-change-motor control signal is not abnormal in both of a case where the motor control signal at the High level is output and a case where the motor control signal at the Low level is output, the CPU 212a determines that the contact-state-change-motor control signal is normal.

The above description is summarized as follows. As a result of the determination in the step S407, when the contact-state-change-motor control signal at the High level is less than the third threshold th3 or when the contact-state-change-motor control signal at the Low level is equal to or more than the fourth threshold th4, the CPU 212a determines that the contact-state-change-motor control signal is abnormal. Accordingly, the CPU 212a specifies the motor controller 234 as a failed portion and specifies the driver unit 230 as a failed part in the step S405. In the meantime, when the contact-state-change-motor control signal at the High level is equal to or more than the third threshold th3 and when the contact-state-change-motor control signal at the Low level is less than the fourth threshold th4, the CPU 212a determines that the contact-state-change-motor control signal is normal and that the signal output section is not out of order. In this case, the CPU 212a proceeds with the process to the step S408.

Next, the CPU 212a checks failure of the control circuit section in the step S408 and determines whether the control circuit section is out of order in a step S409. Then, when the signal output section is out of order, the CPU 212a proceeds with the process to the step S405. When the signal output section is not out of order, the CPU 212a proceeds with the process to a step S410.

In the failure check (S408) for the control circuit section, the CPU 212a obtains the result that the control circuit section of the contact-state change motor 603 is the motor driver 236, from the electric failure diagnosis table (FIG. 16). The CPU 212a sets the first motor driver 236a of the ASIC 231 so as to operate the contact-state change motor 603. A motor control signal is output by the signal output section and is input into the first motor driver 236a. In the state where the power source and the signal are input into the control circuit section in this way, the first current detector 306a detects output current from the control circuit section.

The first current detector 306a detects whether the electric current that flows into the contact-state change motor 603 from the first motor driver 236a is equal to or more than a fifth thresholds th5. The fifth threshold th5 shall be 100 mA. The detection result of the first current detector 306a is transmitted to the CPU 212a through the ASIC 231. The CPU 212a checks a failed portion according to the detection result of the first current detector 306a. When the detection result shows that the electric current that flows into the contact-state change motor 603 is equal to or more than the fifth threshold th5, the CPU 212a determines that the first motor driver 236a is normal. When the detection result shows that the electric current that flows into the contact-state change motor 603 is less than the fifth threshold th5, the CPU 212a determines that the first motor driver 236a is abnormal. When determining that the first motor driver 236a is abnormal, the CPU 212a specifies the control circuit section as a failed portion. That is, the CPU 212a specifies that a failed part is the driver unit 230 when the electric current that flows into the contact-state change motor 603 is less than the fifth threshold th5 (S405). When the control circuit section is normal, the CPU 212a determines that the electric part of the diagnosis target is not out of order (S410).

In addition, the electric failure diagnoses for the monochrome drum motor 600, color drum motor 601, fixing motor 602, and lifter motors 604 are executed as well as the diagnosis for the contact-state change motor 603. In that time, the CPU 212a obtains parts in the power source section, signal output section, and control circuit section corresponding to the diagnosis target from the electric failure diagnosis table (FIG. 16).

In this way, the CPU 212a specifies that the failed part is the power unit 200 in the step S404 in FIG. 17 and specifies that the failed part is the driver unit 230 in the step S405. In the step S410, the CPU 212a determines that there is no failure of the electric part of the diagnosis target. The CPU 212a finishes the process shown in FIG. 17 following the step S404, S405, or S410.

FIG. 18 and FIG. 19 are flowcharts showing the mechanical-unit-failure diagnosis process executed in the step S304 in FIG. 13. The process shown in FIG. 18 is executed when an abnormality of the belt-contact-state change unit 118 is detected. The process shown in FIG. 19 is executed when an abnormality of one of the sheet cassettes 18a through 18d is detected.

First, the CPU 212a starts driving the contact-state change motor 603 in a step S501 in FIG. 18 and starts reading a signal from the density sensor 112 in a step S502. In a step S503, the CPU 212a determines whether a read value by the density sensor 112 varies. The contact state is changed by starting the drive of the contact-state change motor 603. And also, the change of the contact state changes the positional relationship of the density sensor 112 to the intermediate transfer belt 108. Accordingly, if the contact state has switched normally, the read value of the density sensor 112 differs between the noncontact state, the monochrome contact state, and the full-color contact state. Accordingly, the CPU 212a samples the read value of the density sensor 112 in a fourth predetermined period and determines whether the read value has varied beyond a predetermined value.

When the read value has varied, the CPU 212a specifies the HP sensor 242 as a failed portion in a step S504 because the CPU 212a can determine that the HP sensor 242 does not react although the contact-state change operation is performed. In the meantime, when the read value has not varied, the CPU 212a specifies a drive transfer mechanical structure like a gear concerning the belt-contact-state change unit 118 as a failed portion in a step S505 because the CPU 212a can determine that the contact-state change operation is not performed. The CPU 212a finishes the process shown in FIG. 18 after the step S504 or the step S505.

Figure 20:
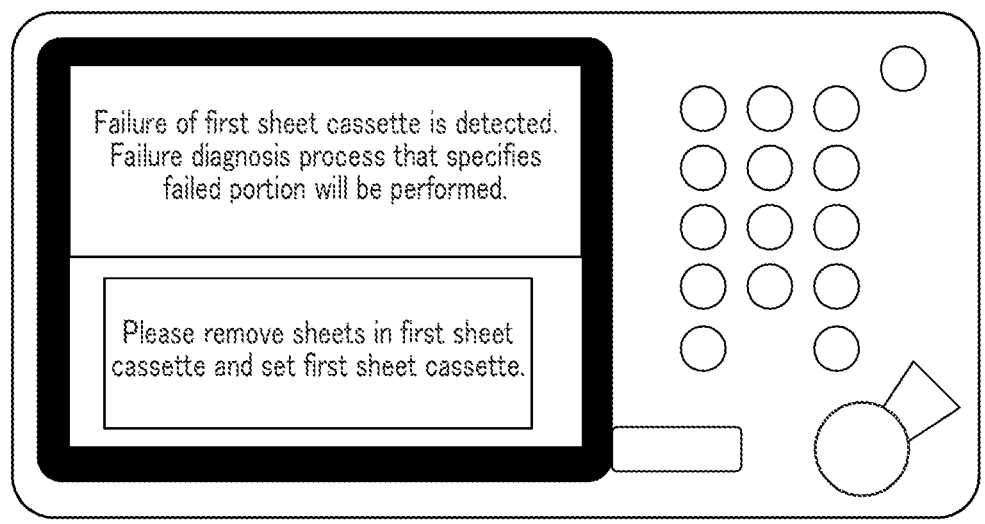
FIG. 20 is a view showing a report screen displayed on the operation unit of the image forming apparatus of FIG. 1.

In a step S601 in FIG. 19, the CPU 212a instructs a user to operate the first sheet cassette 18a by displaying a notification screen as shown in FIG. 20 in order to execute the operation that raises the stacking tray 401 of the first sheet cassette 18a from a lower limit position. In a step S602, the CPU 212a waits until the user completes the switching operation (an open operation and a subsequent close operation) of the first sheet cassette 18a. It should be noted that the switching operation of the first sheet cassette 18a is detected by a sensor (not shown). When the switching operation of the sheet cassette 18 has completed, the CPU 212a starts driving the first lifter motor 604a in a step S603 and raises the stacking tray 401 during a period sufficient to reach the stacking tray 401 to the position of the top face sensor 411.

In a step S604, the CPU 212a monitors the output of the rise sensor 416 and determines whether the output of the rise sensor 416 has varied while the stacking tray 401 rises during the sufficient period. Since it is determined that the stacking tray 401 is rising when the output of the rise sensor 416 has varied, the CPU 212a specifies the top face sensor 411 as a failed portion that disturbs completion of the rising operation in a S605. In the meantime, when the output of the rise sensor 416 has not varied, it is determined that the stacking tray 401 is not rising. In this case, the abnormality of the first lifter motor 604a has not been detected by the already executed electric failure diagnosis process (FIG. 17). Accordingly, the CPU 212a specifies a lifter mechanical structure like a gear that transfers driving force of the first lifter motor 604a as a failed portion that disturbs completion of the rising operation in a step S606. The CPU 212a finishes the process shown in FIG. 19 after the step S605 or the step S606.

Since a unit that consists of the electric part and the mechanical structure is actually driven in the failure diagnosis process (FIG. 13), the failure diagnosis takes a period of several seconds until completion depending on a diagnostic content. Accordingly, when the image output operation under execution is interrupted uniformly at the time of detection of an abnormality, the end of the image output operation may be delayed.

Consequently, the CPU 212a controls the start timing of the main failure diagnosis process (FIG. 13) depending on the type of an abnormality. That is, when an abnormality of the first type that disables an image output operation occurs during execution of an image forming operation, the CPU 212a starts the main failure diagnosis process (from S202) after stopping the image forming operation concerned. Accordingly, when an abnormality of the first type occurs, a failure occurrence place is promptly reported by giving priority to the failure diagnosis. In the meantime, when an abnormality of the second type that allows an image output operation occurs during execution of an image forming operation, the CPU 212a starts the main failure diagnosis process (from S205) of FIG. 13 after the image forming operation is completed. Thereby, downtime is reducible by giving priority to continuation of the image forming operation under execution.

According to the embodiment, a failed portion can be specified while preventing delay of an image forming operation appropriately.

Moreover, the CPU 212a waits to start the failure diagnosis process when there is a new image formation request even when an abnormality of second type occurs and the image forming operation under execution is completed. Then, the CPU 212a starts the failure diagnosis process after an image forming operation corresponding to the new image formation request is completed (S208). Thereby priority can be given to the image forming operation corresponding to the input image formation request and the downtime can be reduced.

Although the present invention has been described in detail on the basis of the suitable embodiments, the present invention is not limited to these specific embodiments and includes various configurations that do not deviate from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-208914, filed Nov. 19, 2019, which is hereby incorporated by reference herein in its entirety.

What is claimed is:
1. An image forming apparatus comprising:
an image forming unit configured to form an image on a recording material; and
a controller configured to:
determine a first type of error;
in a case where the first type of error is determined during execution of an image forming operation in which the image forming unit forms an image on a recording material based on an image formation request, stop the image forming operation so as to start first failure diagnosis that determines a failed unit that causes the first type of error;
determine a second type of error, the second type of error being different from the first type of error;
in a case where the second type of error is determined during the execution of the image forming operation, continue the image forming operation without stopping the image forming operation; and in a case where the second type of error is determined during the execution of the image forming operation, start second failure diagnosis after the image forming operation is completed, the second failure diagnosis determining a failed unit that causes the second type of error.

2. The image forming apparatus according to claim 1, wherein the controller is configured to wait to start the second failure diagnosis in a case where there is a new image formation request after the image forming operation under execution is completed in a condition that the second type of error is determined, and to start the second failure diagnosis after an image forming operation corresponding to the new image formation request is completed.

3. The image forming apparatus according to claim 1, wherein the controller is configured to stop an operation of a place at which the second type of error is determined to occur.

4. The image forming apparatus according to claim 1, wherein an error of a contact-state change unit that switches contact states of an image bearing member and a transfer roller to a photosensitive member belongs to the first type of error.

5. The image forming apparatus according to claim 1, further comprising a plurality of container units that store recording materials, and wherein an error of one of the plurality of container units belongs to the second type of error.

6. The image forming apparatus according to claim 1, wherein an error of a density sensor unit that reads density of a toner image formed on an image bearing member belongs to the second type of error.

7. The image forming apparatus according to claim 1, wherein the controller is configured to perform the first failure diagnosis or the second failure diagnosis for every place at which an error is determined to occur.

8. The image forming apparatus according to claim 1, wherein the controller is configured to report a failed unit determined by the first failure diagnosis or the second failure diagnosis.

9. A control method for an image forming apparatus having an image forming unit that forms an image on a recording material, the control method comprising:
determining a first type of error;
in a case where the first type of error is determined during execution of an image forming operation in which the image forming unit forms an image on a recording material based on an image formation request, stopping the image forming operation so as to start first failure diagnosis that determines a failed unit that causes the first type of error;
determining a second type of error, the second type of error being different from the first type of error;
continuing, in a case where the second type of error is determined during the execution of the image forming operation, the image forming operation without stopping the image forming operation; and
starting, in a case where the second type of error is determined during the execution of the image forming operation, second failure diagnosis after the image forming operation is completed, the second failure diagnosis determining a failed unit that causes the second type of error.

10. The image forming apparatus according to claim 1, wherein, in a case where a new image formation request is input even in a condition that the second type of error is determined, the controller is configured to execute a new image forming operation with the image forming unit based on the new image formation request.

11. The image forming apparatus according to claim 1, wherein the controller does not execute the image forming operation during the first failure diagnosis, and
the controller does not execute the image forming operation during the second failure diagnosis.

12. The image forming apparatus according to claim 1, wherein the image forming unit includes:
a photosensitive member,
an intermediate transfer member on which an image formed on the photosensitive member is transferred,
a transfer member that transfers the image on the intermediate transfer member on the recording material, and
a position change unit that changes a positional relationship between the intermediate transfer member and the photosensitive member, and
wherein an error of the position change unit belongs to the first type of error.

13. The image forming apparatus according to claim 1, further comprising:
a sensor that senses an image for measurement formed by the image forming unit; and
a shutter provided for the sensor,
wherein an opening/closing error of the shutter belongs to the second type of error.

14. The image forming apparatus according to claim 1, further comprising a sheet container that stores sheets of a recording material, the sheet container including:
a tray that supports the sheets of the recording material,
a roller that feeds the sheets of the recording material from the sheet container to a nip portion at which images are transferred on the sheets, and
a motor that moves the tray to one of a first position at which the roller feeds the sheets of the recording material on the tray or a second position at which the roller does not feed the sheets of the recording material on the tray,
wherein an error of a position of the tray belongs to the second type of error.

* * * * *